United States Patent [19]

Huang et al.

[11] Patent Number: 5,553,008
[45] Date of Patent: Sep. 3, 1996

[54] TRANSISTOR-LEVEL TIMING AND SIMULATOR AND POWER ANALYZER

[75] Inventors: Xiaoli Huang; William H. Zhang, both of Cupertino, Calif.

[73] Assignee: EPIC Design Technology Inc., Santa Clara, Calif.

[21] Appl. No.: 500,304

[22] Filed: Jul. 10, 1995

Related U.S. Application Data

[63] Continuation of Ser. No. 40,531, Mar. 29, 1993, Pat. No. 5,446,676.

[51] Int. Cl.$^6$ .................................................. G06F 17/00
[52] U.S. Cl. ............................................. 364/578; 364/488
[58] Field of Search ..................................... 364/578, 488, 364/489, 490, 483, DIG. 1, 232.3; 371/26, 27; 395/916

[56]  References Cited

U.S. PATENT DOCUMENTS 5,446,676   8/1995   Huang ........................................ 364/578

Primary Examiner—Ellis B. Ramirez
Attorney, Agent, or Firm—Townsend and Townsend and Crew LLP

[57]  ABSTRACT

A method for accurately simulating the timing and power behavior of digital MOS circuits is provided. The method includes piece-wise linear modeling of transistors, dynamic and static construction of channel connected components, event driven simulation and current measuring capabilities for power supplies, grounds, and individual resistors and transistors.

19 Claims, 19 Drawing Sheets

Microfiche Appendix Included
(775 Microfiche, 13 Pages)

| | | | | | | | | | | | | | |
|---|---|---|---|---|---|---|---|---|---|---|---|---|---|
| W/L | STATIC | <t,i> | LINK | STAGE | I | g | gm | MODEL | g | d | s | TYPE | LAST i FLUSHED | PREVIOUS i RECORDED | SELF PRINT | POWER-INDEX |
| 136 | 138 | 140 | 142 | 144 | 145 | 146 | 147 | 148 | 149 | 150 | 151 | 152 | 154 | 155 | 156 | 158 |

133 → TRANSISTOR PARAMETER RECORD n
134 → TRANSISTOR PARAMETER RECORD n+1
135 →

TRANSISTOR-LEVEL TIMING AND SIMULATOR AND POWER ANALYZER

This is a continuation of application Ser. No. 08/040,531, filed Mar. 29, 1993, now U.S. Pat. No. 5,446,676.

APPENDIX

A source code listing of a preferred embodiment of the invention is appended in the form of 13 pages.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to method and apparatus for simulating the behavior of digital VLSI MOS circuits. In particular, the invention provides a method and apparatus for the accurate and efficient simulation of high performance digital VLSI MOS circuits on the transistor level. Timing and power behavior can be accurately predicted and analyzed using this method and apparatus.

2. Description of Prior Art

Switch-level timing simulation, represented by such programs as MOTIS and RSIM, serves a critical role in the simulation and verification of logic and timing behavior of a digital MOS circuit on the switch level. It is characterized by (1) switched-resistor models instead of complicated analytical models for MOS transistors; (2) event-driven techniques which obviate the need to solve an entire circuit repeatedly; and (3) estimated timing and logic values, in lieu of solving a set of nonlinear ordinary differential equations, to evaluate the impact of an event on a set of nodes and transistors. These characteristics combine to offer a simulation performance and capacity close to that of gate level logic simulators (e.g. 1000 times faster than circuit simulators for circuits with hundreds of thousands of transistors) at an accuracy level typically of 20% to 30% of circuit simulators for typical digital MOS circuits. As more VLSI chips, especially high speed ones, are experiencing electrical problems caused by nonidealities in transistors and interconnections thereof, switch-level timing simulation is becoming an indispensable software tool for the verification of digital MOS VLSI.

Its popularity notwithstanding, switch-level timing simulation, as characterized by the foregoing techniques, suffers from several problems that increasingly limits its accuracy and reliability. The use of event-driven techniques, where an "event" is typically a change in the logic state of a node, is inadequate to deal with sensitive portions of digital circuits in which changes in voltage levels can be critical to the operation of a circuit even though such changes do not necessarily involve change in logic states. A prime example is a sense-amplifier ubiquitous in the design of memory circuits, the purpose of which is to sense and amplify small voltage fluctuations in the output of memory cells.

Further, the event driven technique, as it is used in existing switch-level timing simulators, implies that logic changes are always completed before the next change occurs. This seriously handicaps its ability to deal with feedback and dynamic behavior as well as glitches and other important circuit phenomena.

Another serious flaw in existing switch-level timing simulators is the use of a switched-resistor model for MOS transistors. Though much faster to evaluate than an analytical model, this crude model, coupled with the simplistic estimation method mentioned above, is not capable of dealing with many first-order electrical effects, such as the controlling effect of gate voltage on the source-drain current. As a result, the model yields poor accuracy for circuits which use pass transistors, charge-sharing, dynamic logic, feedback, or need long input rise/fall times. Incorrect logic values and/or grossly inaccurate timing (50% or 100%) can result when this method is applied to some advanced digital circuits.

Finally, an increasing number of digital MOS designs are becoming prone to current and power related problems, in addition to timing problems. Overheated chips and electron migrations in metal lines are but two of the most prominent problems. Existing timing simulation techniques cannot be extended easily to provide current information, leaving the designer of VLSI chips with no software aids to assess current and power behavior of a design.

It can be seen from the above that a more reliable, yet equally efficient, method for VLSI timing and power simulation is desired, especially for the verification of sophisticated and high speed chips. The ability to provide current and power information is also highly desirable to cope with emerging VLSI power design problems.

SUMMARY OF THE INVENTION

A method of accurately simulating electronic circuits and analyzing these circuits with respect to timing behavior and power consumption is provided. The method accepts a netlist defining the circuit to be simulated, and a technology file containing transistor characteristics including voltage-current array(s) and piece-wise linear transistor approximations created therefrom.

Each node in the netlist is evaluated for inclusion within a static channel connected component ("CCC"). Where a CCC is sufficiently small, the component is assembled once and stored in memory. However, due to memory constraints, larger CCCs must be constructed dynamically during simulation.

Simulation is event driven. An event is a voltage change on a node that exceeds an "event resolution," this voltage change being determined from a previous voltage level which caused an earlier event at the subject node.

When a node is identified as having the next pending event, a transistor connected thereto is identified, and either a static or dynamic CCC is constructed based upon the transistor.

Once the CCC is established, its response to the pending event is evaluated through linear approximation, wherein each transistor contained in the affected channel connected component is replaced with a current source, resistor and transconductor retrieved from the technology file. Where a new event or events are identified at the output node(s) of a CCC during the course of evaluation, these events are scheduled for future determination.

CCC evaluation, more specifically, is carried out by rigorously solving circuit equations and calculating node voltages and element currents which represent a detailed, simulated circuit response. Element currents may be accumulated for obtaining full chip currents.

In a preferred embodiment, the invention provides integrated circuit ("IC") designers with a highly accurate timing and power simulation tool to analyze large IC designs efficiently. Typical accuracy of timing and power is within 2% to 10% of the accuracy of a circuit simulator. Typical speed of simulation is one thousand times faster than circuit simulation of a circuit of two thousand transistors. Further, circuits with over one million transistors may be simulated with this embodiment, whereas circuit simulators can typically only handle up to five thousand transistors.

The preferred embodiment of this invention also provides simulation accuracy and generality (i.e., the capability for handling circuit designs using complex configurations such as charge sharing, dynamic logic, feedback, etc.) that exceeds the scope of switch-level simulators. Further, this embodiment provides current and power measurements unavailable in switch-level simulators.

BRIEF DESCRIPTION OF THE DRAWINGS

FIGS. 9 and 9a illustrate the data structure of a netlist transistor;

DESCRIPTION OF THE PREFERRED EMBODIMENT

Contents

Figure 1:
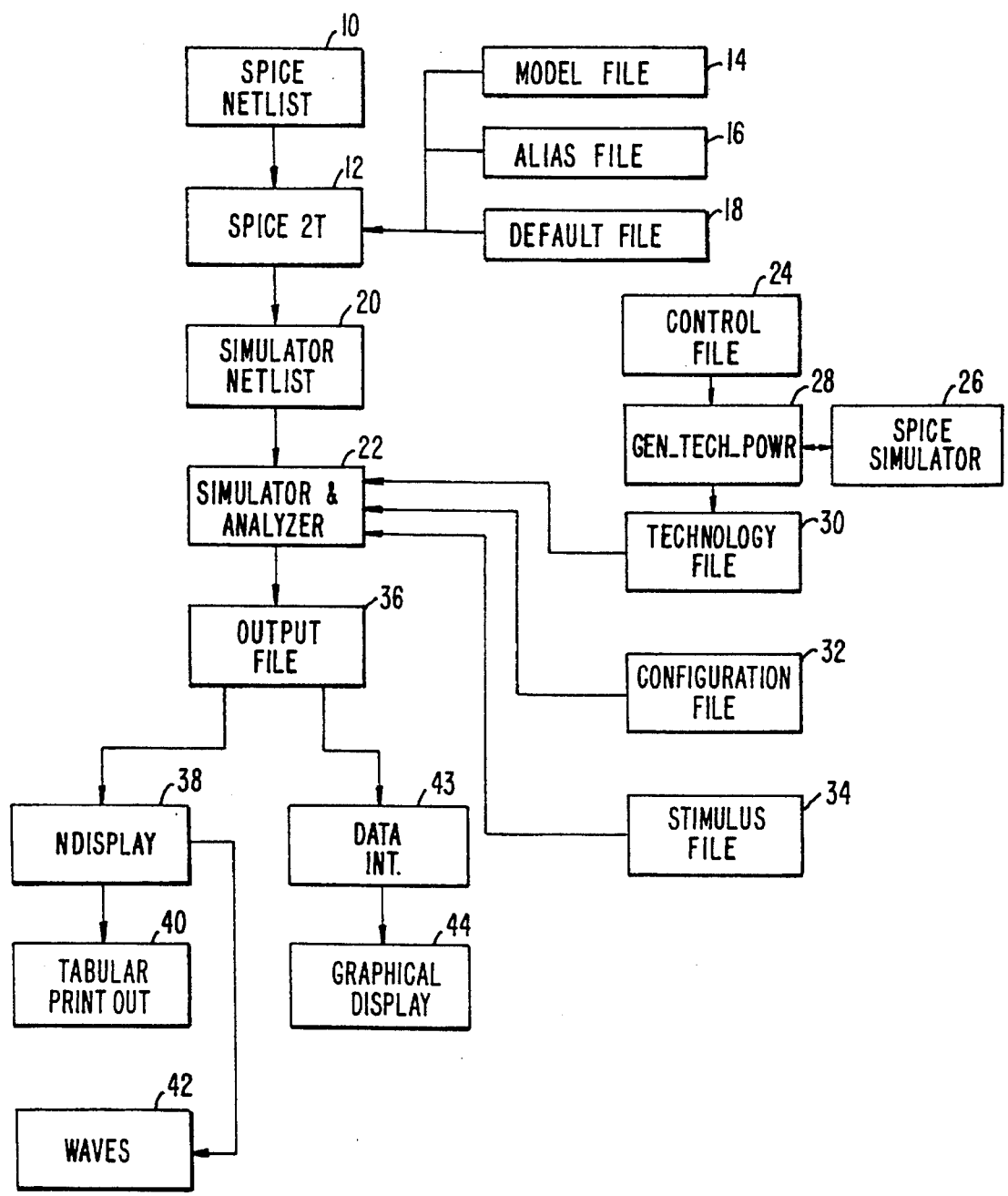
FIG. 1 is a functional block diagram of a system employing a preferred embodiment of the present invention.

I. General Description of Simulator
II. Data Structures for MOS Models
III. Operation
I. General Description of Simulator The method for transistor-level timing and power simulation of digital MOS VLSI circuits described herein is embodied in a digital timing and power simulator. Referring to FIG. 1, the simulator accepts netlist files describing a circuit 20, an input vector file describing logic waveforms for input nodes 34, a technology file containing piece-wise linear tables modeling a particular MOS process at a given temperature 30, and a configuration file specifying run time options 32. The simulator outputs logic and voltage waveforms for user-selected nodes and current waveforms for user-selected elements, blocks or full circuits 36 in response to input excitations for circuits described by the accepted input data. The peak, average and root-mean-square currents for each selected current entity may also be output by the simulator. Source code for one embodiment of the invention is included herewith as Appendix 1.

A. Netlist Files

A netlist file defines the circuit to be simulated; it is constructed from system elements connected by input and output nodes to form a network. The wire connections between elements are referred to as "nets." The system connectivity is established through the common input, output, and biput I/O nodes among the circuit elements. An element can be a single transistor, resistor, capacitor, gate, register, functional model, stimulus function, global timing error function or output probing function.

A conventional netlist file will include element and attribute identifiers. Element identifiers specify the type of function being defined (i.e., element library function, node function, input and output signals), while attribute identifiers indicate the input/output pins, internal state information, and any properties associated with the element. The netlist file may also include capacitance specifications applied to particular nodes, and subcircuit specifications (i.e., collections of elements).

As shown in FIG. 1, circuits formatted in a foreign netlist format 10 such as the SPICE (S-P-I-C-E) format should be translated into a native format for simulator 22. Spice2t 12, a conventional translator utility, converts SPICE netlists into a format preferred by simulator 22. Spice2t may also utilize modelfile 14, aliasfile 16, and/or defaultfile 18 to complete the transformation of a SPICE netlist.

Modelfile 14 contains information for each subcircuit, including the number of input pins, output pins, and biput pins; the pin ordering for the subcircuit interface; the number of states; and whether the subcircuit should be expanded or a model substituted from a model library.

Aliasfile 16 contains aliases for specified nodes in the SPICE netlist. During translation, names in the SPICE netlist referenced in aliasfile 16 are converted to the alternate name specified in aliasfile.

Finally, default file 18 defines the default values for the length and width of MOS devices, and replaces SPICE MOS model names with simulator MOS model names.

B. Stimulus File

Stimulus file 34 contains input data used to stimulate the simulated circuit in simulator 22. The data or stimuli contained in file 34 may be in a variety of formats, including conventional test vectors, simulated clock input, constant period vector stimulus specification (stimulus signals to be applied at fixed time intervals) and logical one and zero constants.

C. Technology File

Technology file 30 is a data file containing user-specified MOS parameters and SPICE generated characteristics (i.e., Vgs, Vds v. Ids) to create piece-wise linear MOS models for circuit simulation. This file is created by gen_tech_powr 28, a utility which accesses data from control file 24 and interfaces directly with SPICE simulator 26 (running HSPICE, Pspice, PRECISE, SPICE2 or SPICE3). The utility submits and invokes all the SPICE runs necessary to characterize CMOS technologies.

Control file 24 is divided into six sections: (1) typical_case_model, (2) parameter, (3) corner, (4) lib, (5) invoke, and (6) options. The typical_case_model section contains MOS transistor models for SPICE. The model parameters for both p and n channel transistor models are listed in this section. The "parameter" section includes values for a plurality of parameters which are identified in Table 1. The "corner" section specifies the voltage and temperature conditions for the process corner that the present technology file accounts for. The "lib" section allows the user to specify a SPICE model library to be used when running gen_tech_powr 28. The "invoke" section contains the user-specified command that invokes SPICE in the simulated environment. Finally, the "options" section contains the user-specified SPICE options that would normally appear in an .OPTIONS statement in a SPICE format. A description of the .OPTIONS statement is provided in P. W. Tuinenga, *SPICE: A Guide to Circuit Simulation & Analysis Using PSpice*, Prentice Hall (1992), incorporated herein by reference.

TABLE 1

| Parameter | Definition |
| --- | --- |
| 1. body_bias | The sampling source voltage values at which the body bias effects are measured. Maximum number of sampling voltages is five. |
| 2. pn_ratio | The typical p-transistor width to n-transistor width ratio used to insure that inverters have equal rise and fall intrinsic delays. |
| 3. NW | A set of typical transistor widths used in calibrations. |
| 4. n_length | The typical channel length of the n-transistor. Maximum number of lengths is ten. |
| 5. p_length | The typical channel length of the p-transistor. Maximum number of lengths is ten. |
| 6. ds_length | The typical drain-source extension. The dimension is used in conjunction with transistor widths to determine the drain and source area and perimeter for drain source diffusion capacitance estimations during simulation, if such geometries are not provided. (Listed in the technology file as diffext.) |
| 7. ldiff/wdiff | Used to explicitly specify the lateral diffusion for transistor widths and lengths. The present invention uses these to calculate the effective width and length of each transistor where: |

TABLE 1-continued

| Parameter | Definition |
| --- | --- |
| | Leffective = Ldrawn-2*ldiff<br>Weffective = Wdrawn-2*wdiff<br>Two numbers are associated with each variable representing NMOS and PMOS lateral diffusions. If these options are not used, gen_tech_powr extracts the lateral diffusion by running SPICE. |
| 8. vds/vgs | Drain to source and effective gate to source voltage ranges and their incremental values are specified for calibrating device currents. |
| 9. thresholdmos | Specifies the zero bias threshold voltage. Typically, this is read from the SPICE model parameter VTO. If it is desired to override this parameter, or adjust it with respect to temperature, or the parameter is missing from the SPICE model, this variable can be used to specify the threshold voltage. |
| 10. vto | Species the threshold voltage for a transistor at nominal temperature. The threshold voltage is used to calculate the body bias effect. |

D. Configuration File

Configuration file 32 contains information used to configure each simulator power analysis execution. File 32 contains a plurality of commands for controlling selected parameters of a simulated circuit (i.e., node capacitance, transistor length or width, etc.) and the selection of data output formats (i.e., reporting peak, average and/or rms current values for one or more nodes).

E. Output

Raw power analysis data from simulator and analyzer 22 are stored in output file 36, a simple data file. Through the process ndisplay 38, a conventional data configuration routine, this data may be displayed in digital 40 (i.e., digital logic values) or analog 42 (waves) form.

Alternatively, raw power analysis data may be graphically displayed through the use of an application program 44 such as SIMWAVE (available from System Science, Inc.). A simple data interface routine 43 between output file 36 and graphical application program 44 facilitates this feature.

F. Hardware

The preferred embodiment of the invention is written using the "C" language, and runs on UNIX™-based engineering workstations such as SUN4, IBM RS6000, HP 700 series, and DECStations. Conforming to the ANSI standard on the "C" language, it can be readily rehosted on any UNIX-based computers with a standard "C" compiler.

Figure 2:
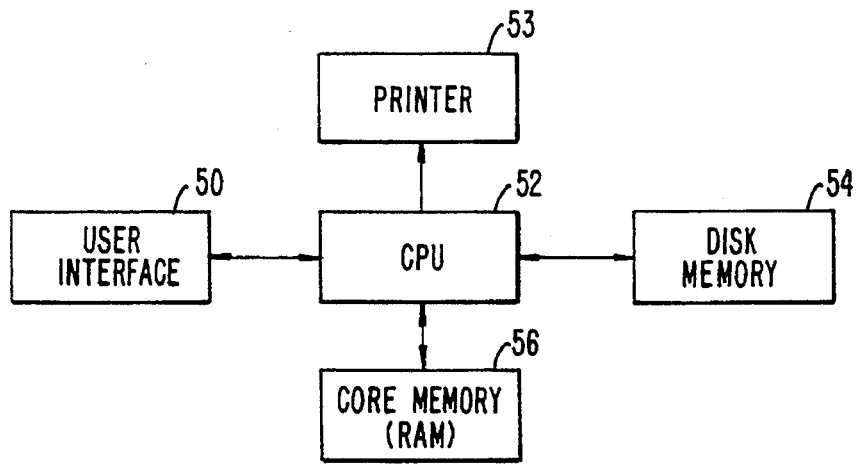
FIG. 2 is a block diagram showing the computer architecture used to support a preferred embodiment of the present invention.

A block diagram of a basic workstation capable of supporting a preferred embodiment of the present invention is shown in FIG. 2. User interface 50 includes a computer monitor, keyboard and/or mouse for inputting various instructions and data to CPU 52. Disk memory 54 holds a variety of files (including netlists, stimulus, technology, and configuration) as well as simulator executable binary code and translator spice2t. Printer 53 provides a means for generating a hard copy of output data. Core memory 56 is fast access memory used by the CPU during processing.

CPU 52 interconnects printer 53, disk memory 54, core memory 56 and user interface 50. During startup, CPU 52 accesses disk 54 and loads necessary files and code to core memory 56 for access during simulation. Processed data may be output to disk memory 54, printer 53, or a monitor at user interface 50.

II. Data Structures for MOS Models

Prior to the simulation process, transistor models are created in technology file 30. The availability of these models enhances simulation performance by eliminating the need to perform time consuming, redundant modeling calculations during simulation.

A. Technology File

Technology file 30 contains six bodies of data required for MOS modeling: (1) diffext, (2) device voltage and temperature, (3) lateral diffusion (both p and n), (4) device current and voltage relationships for user-specified transistor sizes and operating conditions, (5) body bias effect, and (6) parasitic capacitance effects.

Diffext is the length that drain and source diffusions extend past a gate in a MOS model. This parameter is user-specified and input via control file 24 as parameter ds_length (see item 6 of Table 1). The region beyond the gate, where source and drain contacts are made, is what determines the source and drain capacitance.

The temperature and supply voltage of the circuit to be simulated is user-specified and input via control file 24 as parameter "corner," noted above.

Lateral diffusion compensates for variations to a transistor's drawn length and width generated at the transistor's masking and processing stages. In general, the effective length and width for a transistor becomes:

$$Leff = Ldrawn - 2*dL \tag{1}$$

$$Weff = Wdrawn - 2*dW \tag{2}$$

where dL and dW are the variations of length and width due to the lateral diffusion. These variations may be user-specified and input via control file 24 as parameters ldiff/wdiff (see item 7 of Table 1). Alternatively, gen_tech_powr 28 will extract diffusion values by running SPICE simulator 26 if ldiff/wdiff values are not provided.

All widths and lengths input to simulator 22, including technology file 30 and netlist specifications 20, correspond to the drawn widths and lengths. Length and width values for technology file 30 are input through control file 24 as parameters n_length, p_length and NW (see items 3–5 of Table 1). These dimensions are converted internally by simulator 22 to effective widths and lengths and used accordingly.

The remaining sections of the technology file are described below.

1. Device Current and Voltage Relationships

MOS drain-to-source current ($I_{ds}$), gate-to-source voltage ($V_{gs}$), and drain-to-source voltage ($V_{ds}$) relationships are derived from information provided gen_tech_powr 28 via control file 24. This information includes transistor widths and lengths, supply voltage ($V_{dd}$), simulated circuit operating temperature, a plurality of values for $V_{gs}$ and $V_{ds}$ (item 8 of Table 1), and body bias information (i.e., a sampling source voltage (item 1 of Table 1) and a zero bias threshold voltage (item 9 of Table 1)).

In order to derive MOS I-V relationships for a particular transistor, gen_tech_powr 28 creates a SPICE netlist having only a single transistor, and forwards this netlist along with the aforementioned control file information to SPICE simulator 26. SPICE simulator 26, in turn, systematically sweeps through the values of $V_{gs}$ and $V_{ds}$ provided by gen_tech_powr 28, utilizing user-defined SPICE models already existing in the simulator, and generating corresponding values of $I_{ds}$. Gen_tech_powr 28 then captures the SPICE $I_{ds}$ output and formats the results in two-dimensional table 110 as shown in FIG. 3.

Table 110 contains MOS current values ($I_{ds}$) corresponding to pairs of $V_{gs}$ and $V_{ds}$ values. Significantly, this modeling calculation is performed only once prior to actual circuit simulation by simulator 22. Of course, subsequent calculations may be performed to accommodate changes in device or operating conditions.

Figure 3:
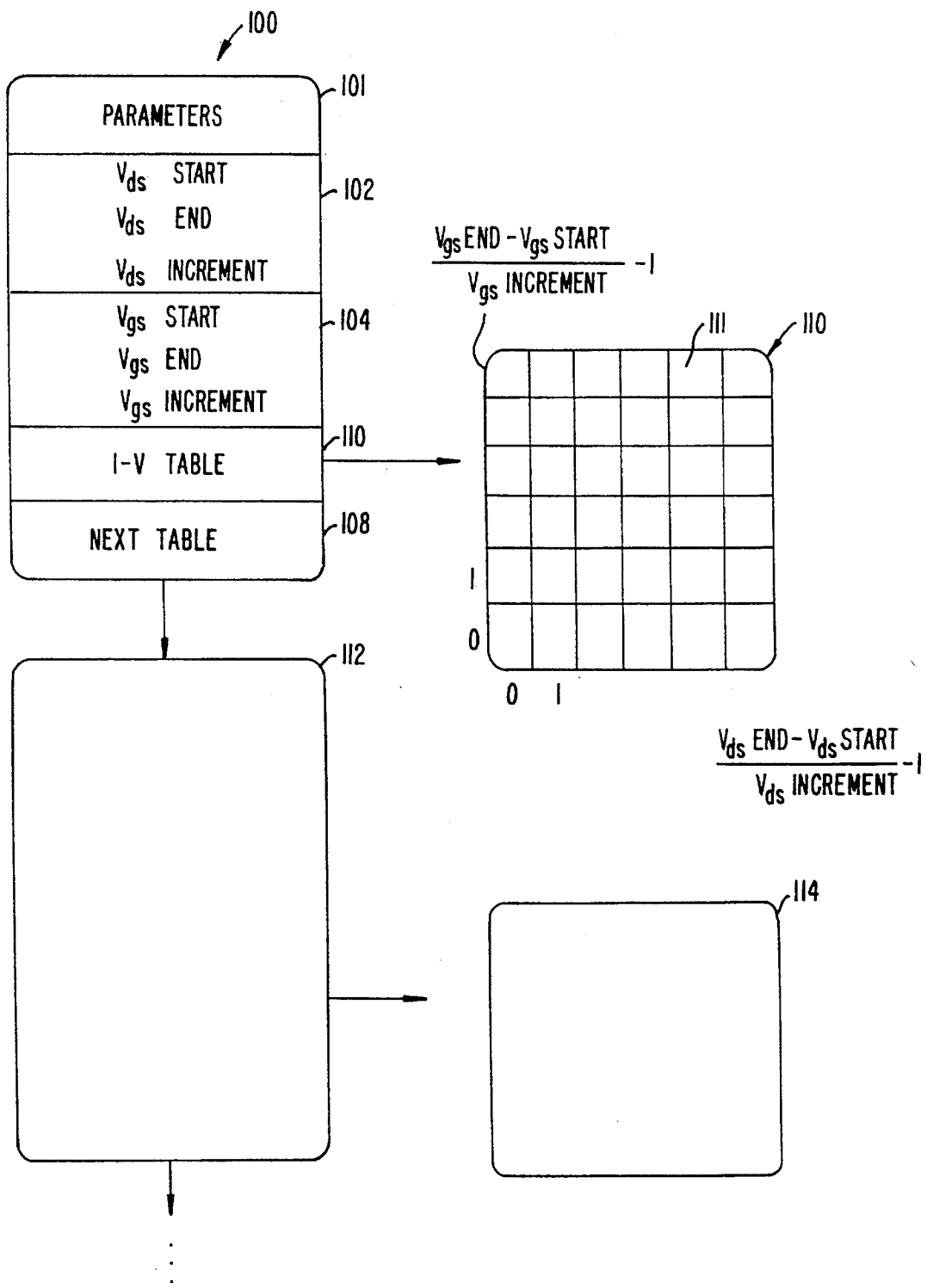
FIG. 3 illustrates an I-V table data structure.

As shown in FIG. 3, technology file 30 includes an I-V table data structure 100 containing parameters 101 (transistor length and width, operating temperature, maximum supply voltage ($V_{dd}$) value, and body-bias information), $V_{ds}$ values 102 ($V_{ds\ start}$, $V_{ds\ end}$, $V_{ds\ increment}$) and $V_{gs}$ values 104 ($V_{gs\ start}$, $V_{gs\ end}$, $V_{gs\ increment}$). Voltage start and end values define the voltage range under consideration, and voltage increment is the voltage step size. Data structure 100 also contains a corresponding I-V table 110. Each grid 111 in table 110 contains a MOS $I_{ds}$ value corresponding to distinct $V_{gs}$ and $V_{ds}$ combinations. Index ranges for the table are defined by the following two equations:

(3) Row: $((V_{gs\ end} - V_{gs\ start})/V_{gs\ increment}) - 1$ (4) Col.: $((V_{ds\ end} - V_{ds\ start})/V_{ds\ increment}) - 1$ Technology file 30 may have more than one I-V table as shown in FIG. 3. Additional tables and corresponding data structures, such as table 114 and structure 112, may be created in the same technology file, however, all such tables must rely on the same operating temperature, maximum supply voltage ($V_{dd}$) value, and $V_{gs}/V_{ds}$ values (i.e., transistor length and width, and body bias information may vary).

$I_{ds}$ values contained in table 110 are normalized over $W_{eff}/L_{eff}$ (see equations 1 and 2 above). Since the device current is generally proportional to channel width and inversely proportional to channel length, such normalization tends to yield $I_{ds}$ values of the same order of magnitude for different $W_{eff}$ and $L_{eff}$ cases.

I-V table 110 can be made arbitrarily accurate at the expense of additional memory space, and can be quickly accessed through two index operations. Many intricacies of MOS transistors, especially those that have submicron dimensions and those used in a complicated manner, can be readily captured. In the present embodiment, incremental values of $V_{gs}$ and $V_{ds}$ may range from 0.1 to 0.5 volts, with a 0.2 volt increment being preferred (i.e., providing adequate accuracy).

2. Body-Bias Effect

The Vgs value used in I-V table 110 is $V_{gs}$, effective ("$V_{gs,eff}$"), rather than the $V_{gs}$ value specified by the user. This value, defined by equation 5, is the gate to source voltage of a transistor minus its threshold voltage ($V_t$):

$$V_{gs,eff} = V_{gs} - V_t \tag{5}$$

The dependence of $V_{gs,eff}$ (as a function of $V_t$) on the substrate voltage ($V_s$), commonly referred to as the body-bias effect, is included in the MOS model of the present embodiment. Instead of augmenting two-dimensional I-V table 110 into three dimensions, however, a separate one-dimensional table is used to model this effect.

The threshold voltage of a transistor as a function of the body bias voltage (i.e., substrate voltage, $V_s$), may be represented as:

$$V_t = f(V_s) \tag{6}$$

At $V_s = 0$ (zero), $V_t = VTO$, which is a SPICE parameter defined for any transistor model. This value may be adjusted by control file 24 parameter thresholdmos (item 9 of Table 1). When $V_s$ is not 0 (zero), the function $f(V_s)$ can be complicated. Since this function is not particularly sensitive, the simulator creates a linear approximation of the effect. The function is sampled at a few Vs values (Vs1, Vs2, etc.) producing tabulated threshold values (Vt1=f(Vs1), Vt2=f(Vs2), etc.) in technology file 30. Similar to I-V table construction, these values are obtained by invoking user-defined SPICE models in SPICE simulator 26 through gen_tech_powr 28.

Figure 4:
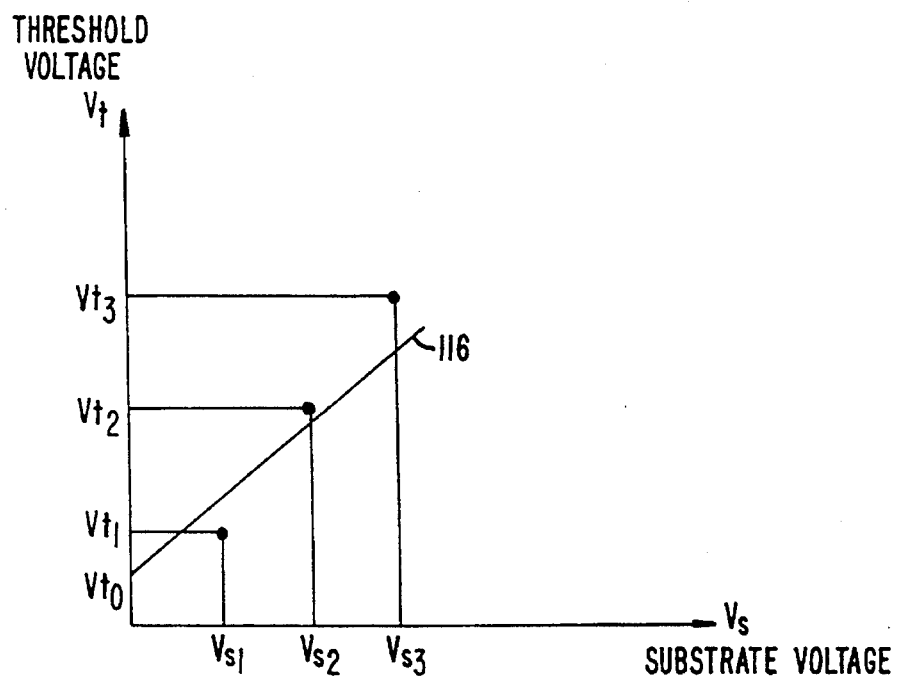
FIG. 4 illustrates a linear approximation of body bias voltage as used by a preferred embodiment of the present invention.

After the corresponding $V_s$ and $V_t$ values are loaded into technology file 30, they are reduced to a line of best fit; shown in FIG. 4 as line 116. Line 116 has a slope equal to $\gamma$, and is described by the following equation:

$$Vt = VTO + \gamma Vs \tag{7}$$

The coefficients VTO and $\gamma$ are stored in I-V table data structure 100 in parameters 101. The linear approximation provided by line 116 facilitates fast calculation of $V_t$ for any $V_s$.

3. Parasitic Capacitance

The technology file also includes calibrated gate and diffusion capacitances. These capacitances are constant values and are added to discrete capacitors (i.e., those included in netlist 20) to determine total capacitance of a corresponding node. Similar capacitor processing is taught by RSIM and MOTIS. This summation is then stored in a data structure created specifically for the node at issue for subsequent processing.

More specifically, parasitic capacitance is determined through SPICE simulator 26. Gen-tech-powr 28 inputs a SPICE netlist having a single transistor, and simulates the application of a 0 to $V_{dd}$ voltage change applied to a first node of the transistor. A resulting change in voltage on a second node is observed, and SPICE calculates the charge change ($\Delta q$) on their node. A constant capacitor is then calculated from the following equation:

$$C\text{parasitic} = \frac{\Delta q}{\Delta V} = \frac{\Delta q}{Vdd - \phi} \tag{7a}$$

The principal behind this calculation is discussed in B. R. Chawla, H. K. Gummel, P. Kozah, *MOTIS—An MOS Timing Simulator*, IEEE Transactions,.CAS, (December 1975).

B. Piece-Wise-Linear (PWL) MOS Transistor Model

As mentioned above, the simulator uses a PWL model for MOS transistors. This model is efficient to evaluate and is comparable in accuracy to analytical models for circuits found on digital MOS chips. It is derived from the general proposition that $I_{ds}$ is a function of $V_{ds}$ and $V_{gs,eff}$ (i.e., $I_{ds}=f(V_{ds}, V_{gs,eff})$). This relationship is illustrated graphically in FIG. 6, which shows varying values of $I_{ds}$ (i.e., $i_0$–$i_3$) in response to different pairs of $V_{ds}$ and $V_{gs,eff}$.

Figure 6:
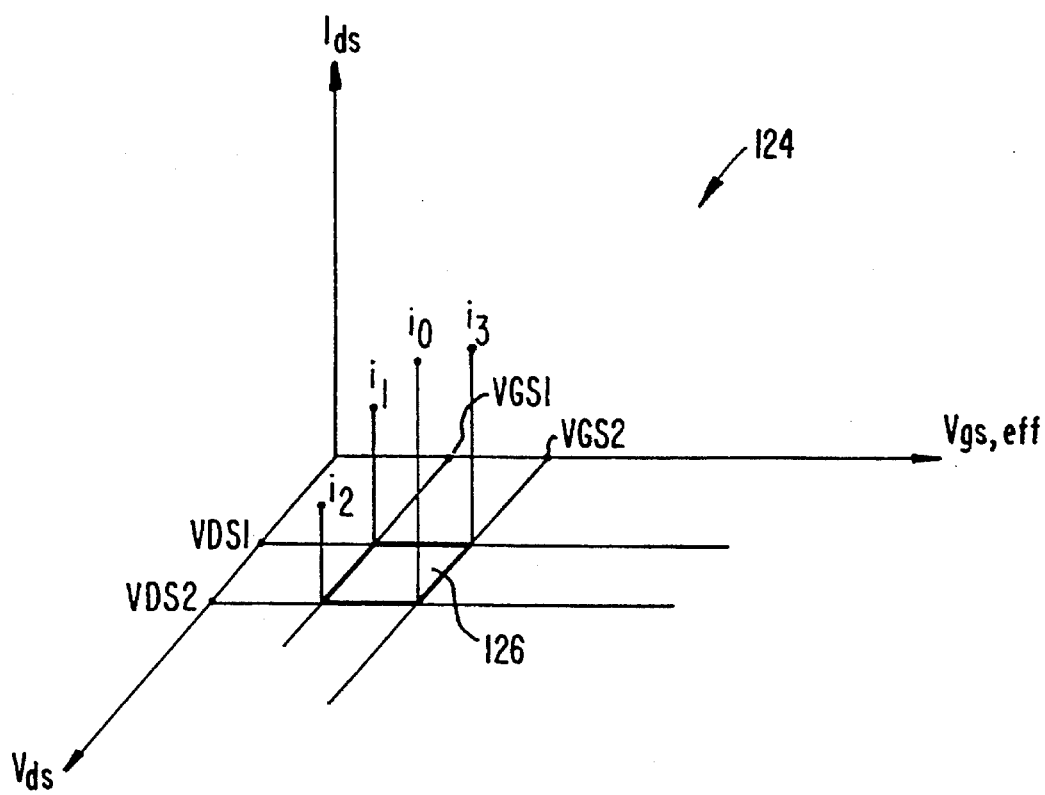
FIG. 6 illustrates the relationship between $I_{ds}$, $V_{ds}$ and $V_{gs}$ in three-dimensional space.

This graphical relationship may be expressed mathematically in the form of a Taylor series expansion, enabling the calculation of any value "i" within bounded area 126 of FIG. 6, given $V_{ds}$, $V_{gs}$ and neighboring voltage/current relationships (i.e., $i_1 = f(VDS1, VGS1)$, $i_2 = f(VDS2, VGS1)$, etc.) This mathematical relationship is expressed by the following equations:

$$i = i_1 + \frac{\partial i}{\partial Vds}(Vds - VDS1) + \frac{\partial i}{\partial Vgs,eff}(Vgs,eff - VGS1) \tag{8}$$

$$i = i_1 + \frac{i_2 - i_1}{VDS2 - VDS1}(Vds - VDS1) + \frac{i_3 - i_1}{VGS2 - VGS1}(Vgs,eff - VGS1) \tag{9}$$

$$i = I + gVds + gmVgs,eff \tag{10}$$

where:

$$g = \frac{i_2 - i_1}{VDS2 - VDS1} \tag{11}$$

$$gm = \frac{i_3 - i_1}{VGS2 - VGS1} \tag{12}$$

$$I = i_1 - gVDS1 - gmVGS1 \tag{13}$$

Figure 5:
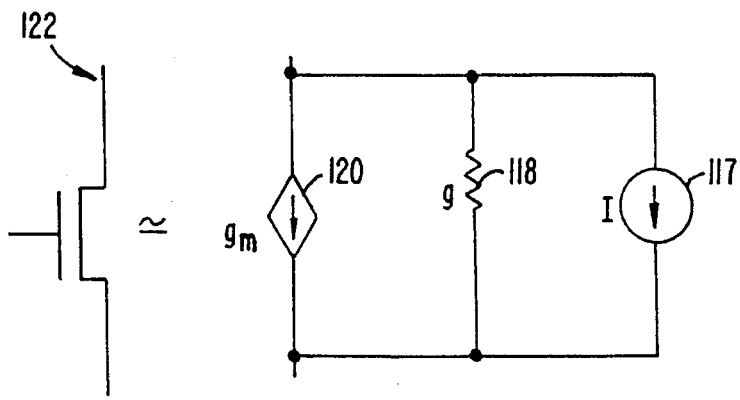
FIG. 5 schematically illustrates the piece-wise linear approximation of a MOS transistor.

It is clear from the foregoing that the nonlinear behavior of MOS transistor 122 can be approximated by a current source I, a linear resistor g and a transconductor gm. This linear approximation is schematically illustrated in FIG. 5, with current source 117, resistor 118 and transconductor 120 replacing transistor 122.

Further, the current value (I), resistance (g) and transconductance (gm) can be derived from the values of current on three neighboring points in a three-dimensional space defined by $I_{ds}$, $V_{gs,eff}$ and $V_{ds}$, as illustrated in FIG. 6. The proximity of these points directly determines the quality of the approximation.

Figure 7:
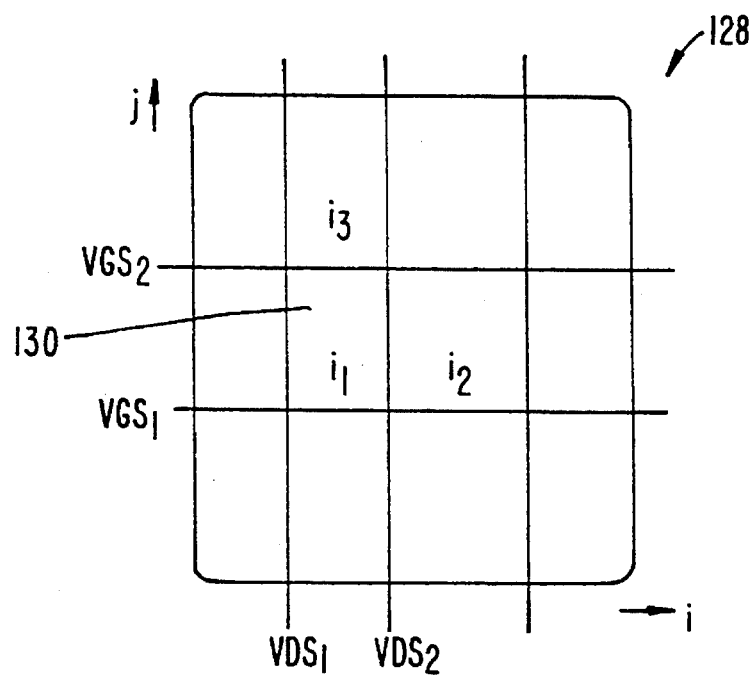
FIG. 7 illustrates the conversion of an I-V table to an I-g-gm table.

In operation, simulator 22 will identify the I-V tables to be used for each transistor in the netlist based upon the closeness of each transistor size (i.e., W and L) to the sizes available in the tables. Those I-V tables not used are discarded, and the remaining tables are converted to I-g-gm tables utilizing the relationships described in equations (11)–(13). For example, with reference to FIG. 7, grid 130 in I-V table 128 is converted by replacing $i_1$ with:

$$g = (i_2 - i_1)/(VDS2 - VDS1) \tag{14}$$

$$gm = (i_3 - i_1)/(VGS2 - VGS1) \tag{15}$$

$$I = i_1 - gVDS1 - gmVGS1 \tag{16}$$

The calculation of these values prior to simulation enables the efficient PWL modeling of MOS transistors. During simulation, a MOS transistor is replaced or "linearized" with current source 117, resistor 118 and transconductor 120, the values of which are constantly updated according to which converted I-V table the operating Vgs and Vds fall into.

III. Operation

Figure 8:
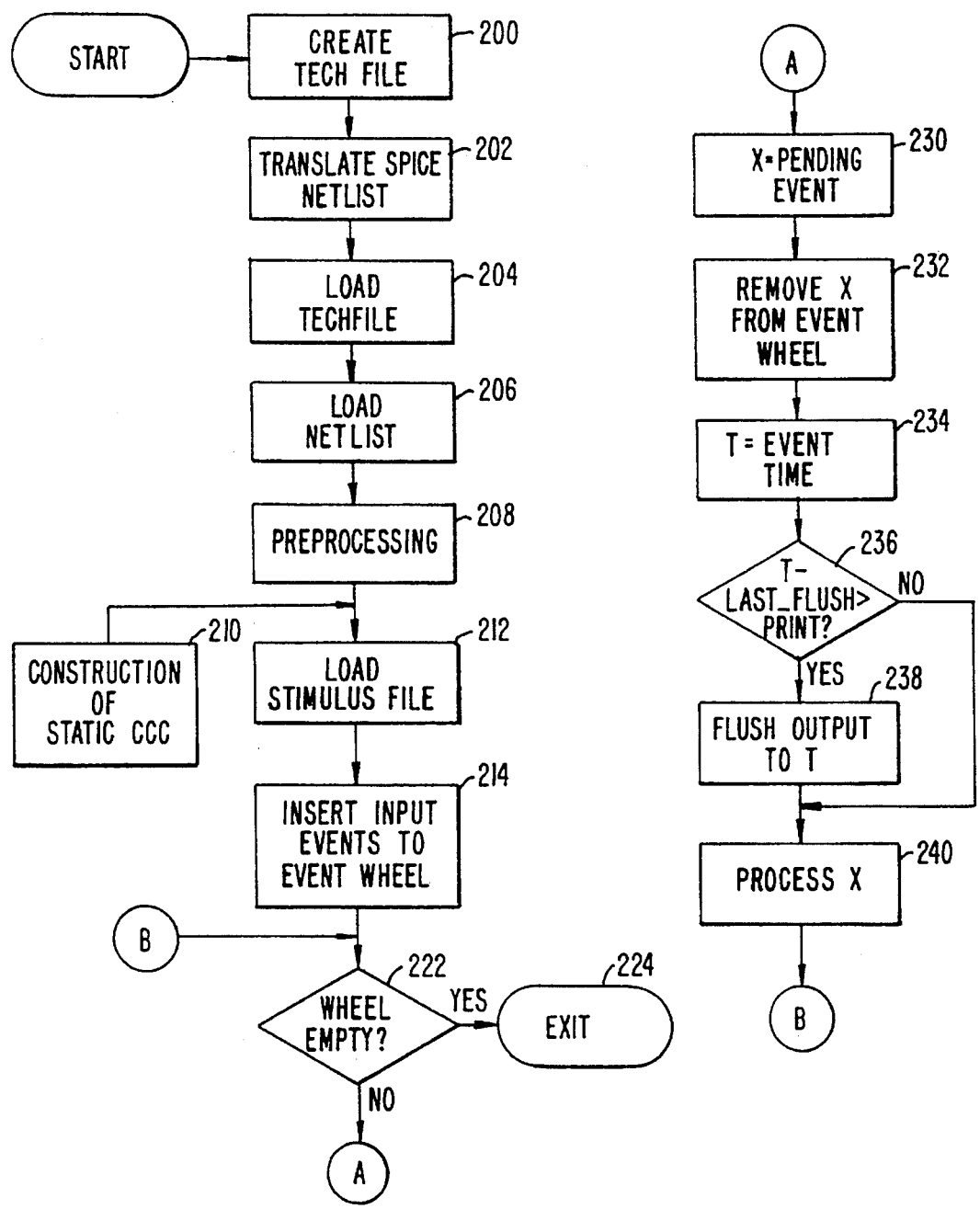
FIG. 8 is a flowchart of the top-level operation of one embodiment of a simulator according to the present invention.

FIG. 8 provides an overview of an electrical circuit simulation and analysis method according to one embodiment of the present invention. In block 200, prior to actual simulation, a technology file is created. In block 202, a SPICE netlist is translated into simulator format via spice2t 12. The technology file and netlist are then loaded into RAM in blocks 204,206 and preprocessing in block 208 is initiated.

During preprocessing, simulator netlist 20 (FIG. 1) is accessed and data structures are built associating parameters with and identifying interrelationships between circuit elements. For example, as shown in FIG. 9, transistor data structure 132 is constructed from an array of transistor parameter records 133, 134 and 135. Each transistor parameter record includes fields shown in FIG. 9 and described in Table 2, such as W/L ratio 136, static 138, <t,i> pair 140, link 142, stage 144, I 145, g 146, gm 147, model 148, gate 149, drain 150, source 151, and type 152.

Transistor data structure 132 also contains resistor models derived from netlist 20 during preprocessing. Resistor models are treated as "specialized" transistors utilizing g field 149, but ignoring most others (i.e, no I 145 or gm 147 values).

Figure 9A:
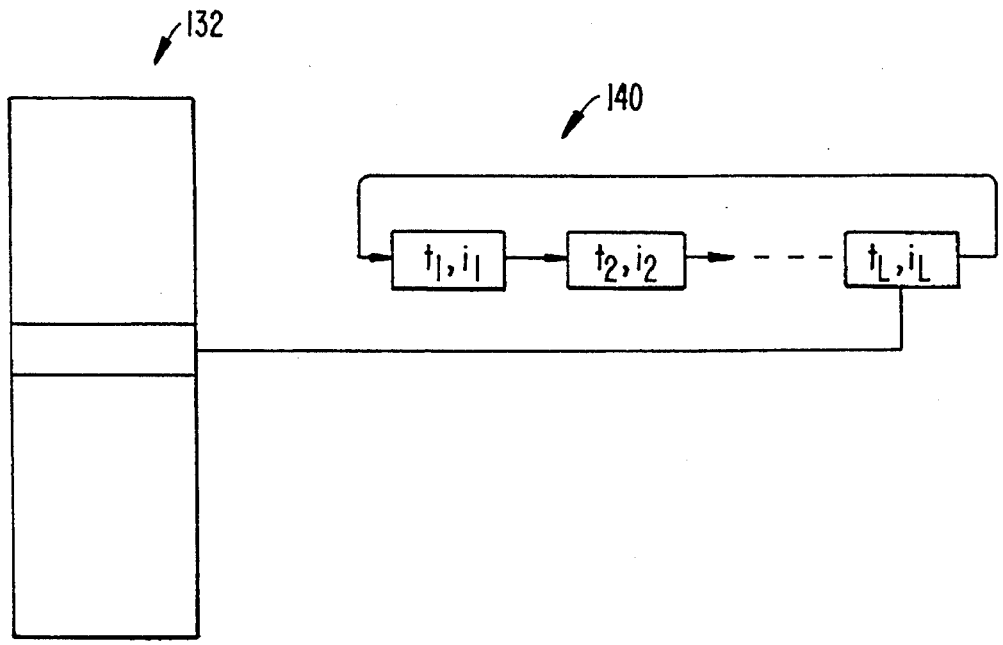
Figure 9B:
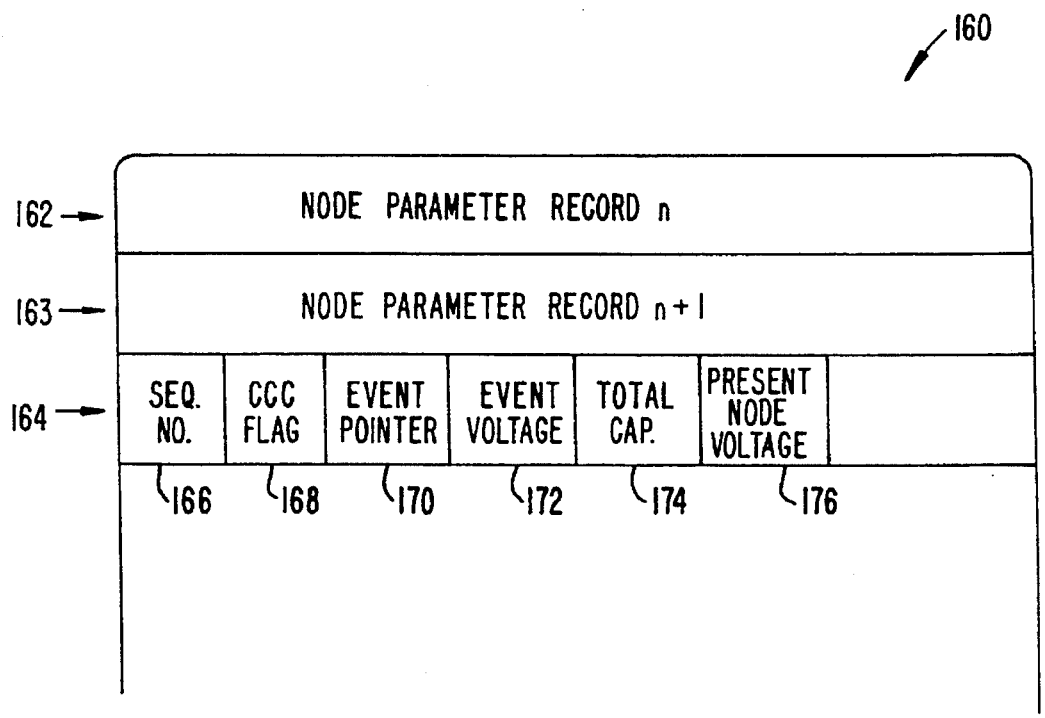
FIG. 9b illustrates the data structure of a netlist node.

As shown in FIG. 9b, a similar data structure 160 is created for netlist nodes. Node parameter records 162, 163 and 164 contain a variety of fields including: sequential number 166 (unique number assigned to each node), CCC flag 168 (indicating membership in a CCC), event pointer 170 (pointing to the next event scheduled for node), voltage 172 (last voltage at node causing an event), total capacitance 174 (total capacitance at node) and present node voltage 176. The significance of some of these fields is discussed in greater detail below.

TABLE 2

| 1. ratio: | Width/Length - used to calculate piecewise linear parameters for specific transistor from normalized values stored in two-dimensional tables |
|---|---|
| 2. static: | Boolean flag identifying transistor as a member of a static channel connected component |
| 3. <t,i> pair: | Linked list of time_current pairs |
| 4. link: | Link for threading transistors belonging to same channel connected component; created when building associated channel connected component |
| 5. I,g,gm: | Piecewise linear parameters; values stored with transistor after retrieved from table and before channel connected component equations are set up |
| 6. model: | Pointer for model structure |
| 7. g,d,s: | terminal nodes |
| 8. type: | P or N MOS |
| 9. self_print: | Boolean flag indicating if user wants to see transistor current |
| 10. power_index: | Index into power_buffer when transistor is connected to the corresponding power supply node |
| 11. stage: | pointer to channel connected component structure to which the transistor belongs |
| 12. last_i: | last current value flushed |
| 13. previous_i: | last current value recorded |

A. Construction of Channel Connected Components

Figure 10:
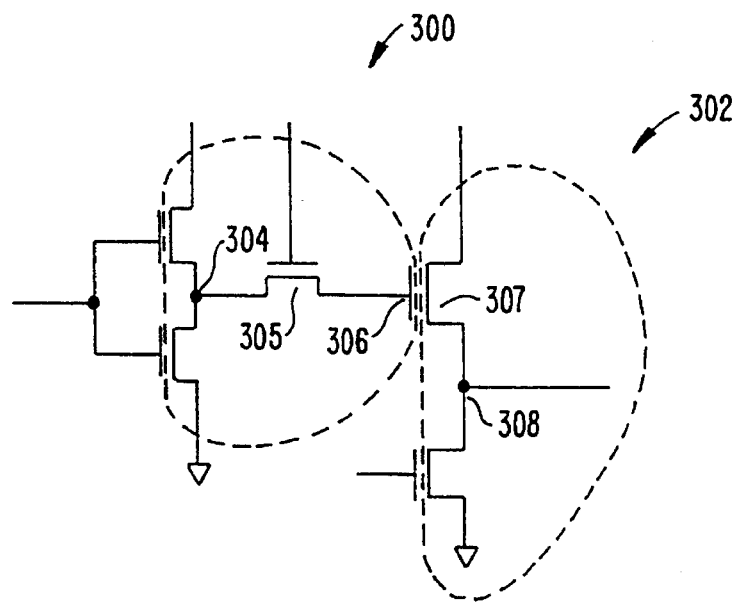
FIG. 10 illustrates the concept of channel connected components.

After completing preprocessing in block 208, simulator 22 constructs static channel connected components in block 210 based on netlist 20, as shown in FIG. 8. A channel connected component ("CCC") is a set of nodes and transistors interconnected through transistor channels. As illustrated in FIG. 10, nodes 304 and 306 are included in CCC 300, interconnected via the channel of transistor 305. Conversely, node 308 is included in CCC 302, separated from CCC 300 by the gate of transistor 307.

A property of MOS circuitry is that nodes in the same CCC are closely coupled and must be evaluated together. The coupling between two separate and distinct CCCs, on the other hand, (such as CCC 300 and 302) is not as strong and direct. Accordingly, such CCCs can be evaluated in a decoupled manner, as described below.

Typically, a CCC is constructed either statically, based exclusively on the topological structure of the circuit, or dynamically, taking into account the conducting state of each transistor. The simulator takes a hybrid approach, where small CCCs are constructed statically, prior to simulation, and accessed intact from memory during the course of simulation. Conversely, large CCCs are constructed dynamically during simulation.

A "small CCC" is defined by the user in terms of node quantity (i.e., "node threshold"). Any CCC containing more nodes than the node threshold is deemed a large CCC, and built dynamically.

Dynamic construction of CCCs occurs during simulation, and includes only those nodes connected through channels of active transistors. Large CCCs are not built statically due to memory constraints.

Figure 11A:
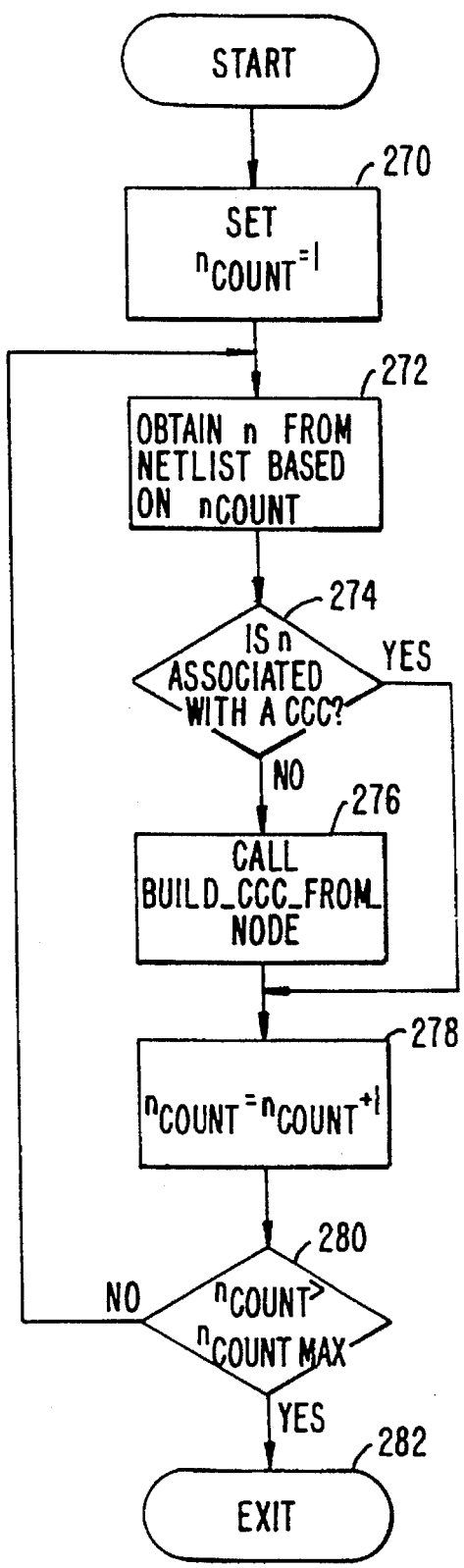
FIG. 11a and 11b are flowcharts of channel connected component construction.
Figure 11B:
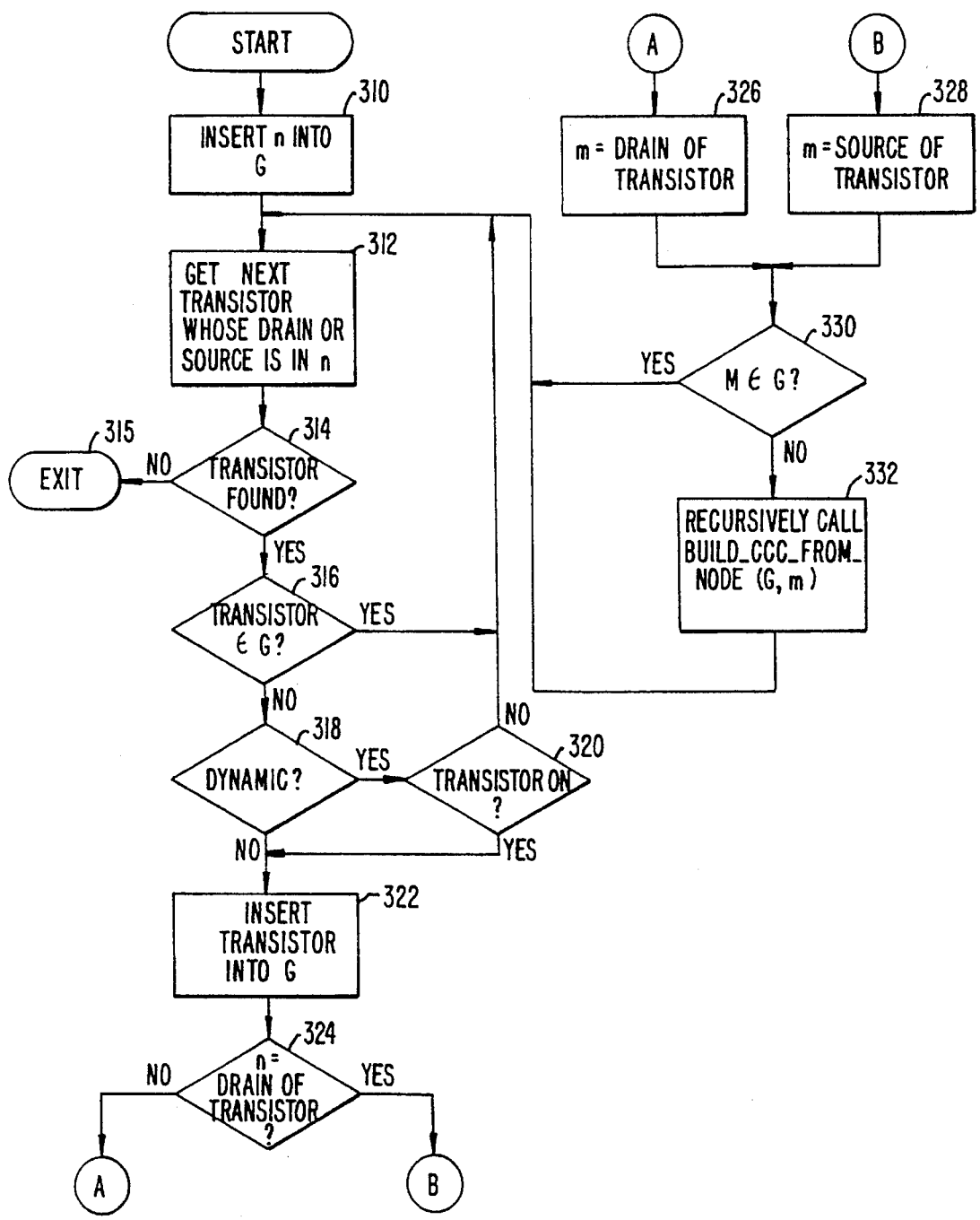

An expanded description of block 210 in FIG. 8 is provided in FIGS. 11a–b. As shown in FIG. 11a, node counter "ncount" is initially set equal to 1 in block 270. This number is applied to field 166 of node data structure 160, as illustrated in FIG. 9b. As mentioned above, this data structure, among other things, assigns to each node a unique, sequential number 166, and a flag 168 indicating membership in a CCC.

Returning to FIG. 11a, the "first" node from the data structure is identified and retrieved in block 272, and its flag is checked to determine whether the node is already associated with a previously identified CCC in block 274. If it is not, the subroutine "build_ccc_from_node" is called in block 276, and a CCC is built around the node as detailed in FIG. 11b.

If the node is already associated with a CCC or is newly associated after calling build_ccc_from_node in block 276, ncount is incremented in block 278, and the new node count is checked to determine whether the number of nodes in the netlist has been exceeded in block 280. If it has, the subroutine is terminated in block 282, and control is returned to the program described in FIG. 8. Otherwise, the subroutine returns to block 272 to evaluate the node associated with the new node count.

The subroutine build_ccc_from_node, detailed in FIG. 11b, describes the process for both static and dynamic CCC construction. Initially, the node "n" identified in block 272 (FIG. 11a) is associated with a particular CCC (i.e., "G") in block 310. G represents the CCC structure being built, while n is the node at which G is expanding.

The loaded netlist is then searched in block 312 to locate the first transistor on node n. A check is made as to the success of locating a transistor in block 314. If no transistor is found (because all transistors have been evaluated or no transistors were connected to the node in the first place), the subroutine is exited in block 315. Otherwise, the transistor is checked to determine whether it is already a member of CCC G in block 316. If it is, the subroutine returns to block 312 to retrieve the next transistor associated with node n. Otherwise, the transistor is checked for dynamic status (i.e., "static" flag 138 in transistor data structure 132 (FIG. 9) is marked false) in block 318. During static CCC construction, no transistor has yet been identified as dynamic, so the query in block 318 is answered in the negative during this phase. Accordingly, the transistor under consideration is inserted into G in block 322, and processing continues.

The subroutine next determines whether the source or drain of the subject transistor is connected to node n in block 324. That portion not connected to node n is identified with variable m in blocks 326,328, and this new node is then checked for membership within CCC G in block 330. If node m is included within G, the subroutine returns to block 312 to retrieve the next transistor. Otherwise, build_ccc_from_node is recursively called at node m in block 332, effecting a "depth-first" approach to CCC construction. The depth-first search algorithm is well known to those of skill in the art. Assuming no additional nodes are connected to node m, the subroutine will return to evaluation of node n once all transistors connected to m have been inspected.

Figure 12:
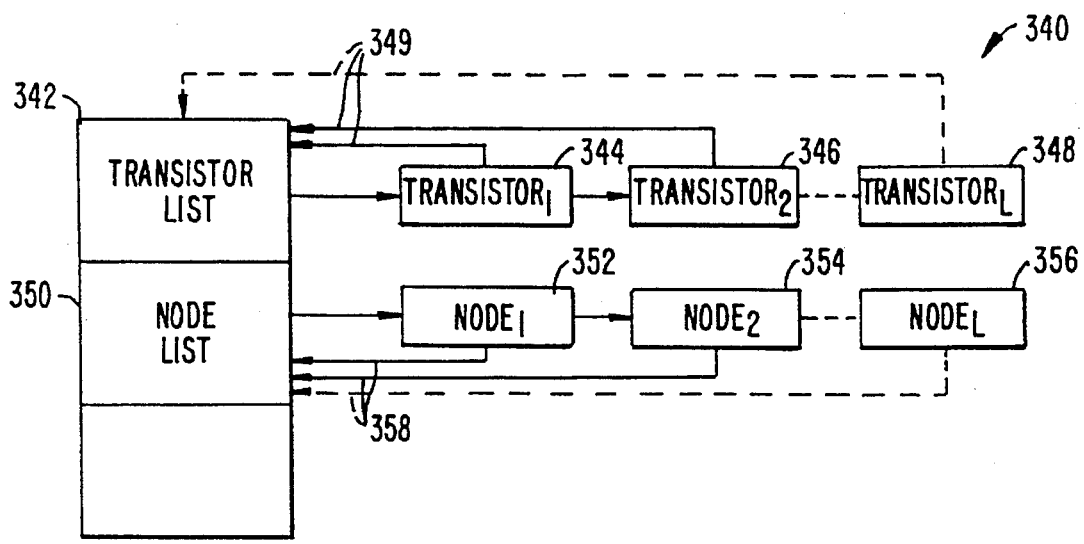
FIG. 12 illustrates a channel connected component data structure.

The CCC G data structure 340 is illustrated in FIG. 12. The structure comprises a plurality of data lists, two of which are shown. Transistor list 342 contains a linked list of transistors 344, 346 and 348 contained in CCC G 340. Each transistor has a pointer 349 enabling the transistor to be identified with a specific CCC. The link between transistors is identified by transistor parameter "link," item 4 in Table 2. Similarly, node list 350 contains a linked list of nodes 352, 354 and 356 (with pointers 358) contained in CCC G 340.

After static CCC construction has been performed on all nodes, each newly-created CCC is evaluated for node quantity. All transistors associated with a CCC found to exceed the aforementioned node threshold are classified dynamic by marking "static" flag 138 for each transistor false (see FIG. 9 and Table 2). The "large" CCC structure is then discarded, only to be rebuilt as a dynamic CCC during the course of simulation.

As noted above, dynamic CCC construction also utilizes the subroutine build_ccc_from_node. When constructing CCCs dynamically, the query in decision block 318 is answered in the affirmative. Accordingly, the conducting state of the transistor determines its membership within a dynamic CCC in block 320. If the transistor is conducting, it becomes part of the dynamic CCC in block 322. Otherwise, the routine returns to block 312 to retrieve the next available transistor.

B. Event Driven Simulation

After static CCCs are constructed, stimulus file 34 (FIG. 1) is loaded into RAM in block 212, as shown in FIG. 8. In addition to test vectors, this file contains initialization vectors to set the simulated circuit to a predefined state prior to beginning actual simulation.

Timing in the simulator is "event driven." Events are defined as any node voltage changes at a future time that exceed a certain threshold, or "event resolution." In the present embodiment, the event resolution is a global constant defined by the user or simulator (i.e., as a default value) with a preferred value of one-tenth the supply voltage ($V_{dd}$). Events are added to, and sometimes canceled from, a global data structure containing a list of events sorted by their time of occurrence. This data structure holds both external (i.e., input vectors) as well as internal events.

Figure 13:
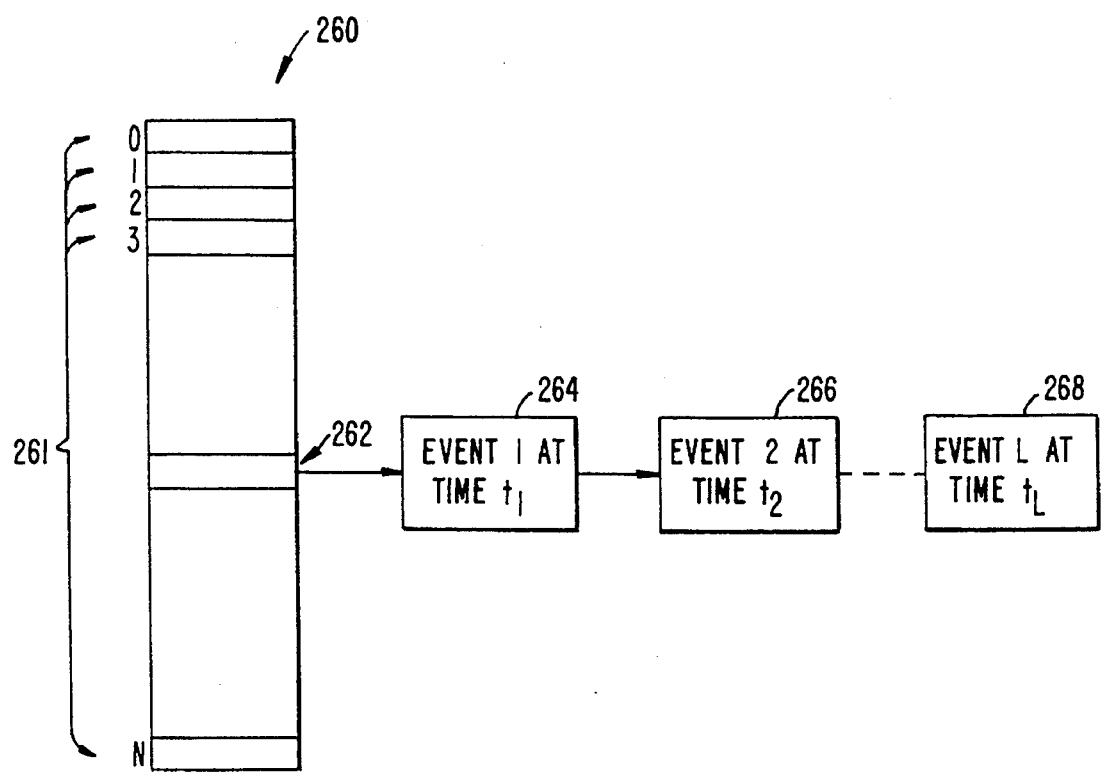
FIG. 13 illustrates an event wheel data structure.

The particular data structure used in this embodiment is a folded array known as an "event wheel." As shown in FIG. 13, event wheel 260 contains N timesteps 261, each of which may hold one or more future events for processing. For example, timestep 262 holds events 264, 266 and 268 scheduled at times t1, t2 and tL, respectively (where t1≦t2≦tL). In one embodiment, the minimum resolution for a timestep is 10 picoseconds.

Simulation proceeds by processing all events pending at the current simulation time and advancing the current time to the timestep at which the nearest future event is pending. As illustrated in FIG. 8, "input events" are initially inserted into the event wheel of the simulator at block 214. These events are simply input vectors created to initiate the simulation, and begin generating internal events, as described below. In block 222, the event wheel is checked for the presence of events. If none exist, the program is exited at block 224 and the simulation is terminated. Otherwise, the system clock advances to the time of the next pending event, which is retrieved as event "x" in block 230 and removed from the event wheel in block 232.

Prior to processing event x, simulator 22 checks the event time to determine whether accumulated current and time data collected during CCC evaluation, as discussed below, should be output. Simulator 22 sets variable T equal to the present event time in block 234, and then compares this value with variables "PRINT" and "last_flush." PRINT is a user-defined quantity for determining the length of delay before flushing (i.e., outputting) data. Last_flush is a variable whose value is incremented each time data is output. If T has increased such that T minus last_flush is greater than PRINT, current and time data is output up to time T in block 238. The subroutines accessed for performing this operation are flush_output, flush_section and flush_staging_area, discussed in detail below.

Figure 14:
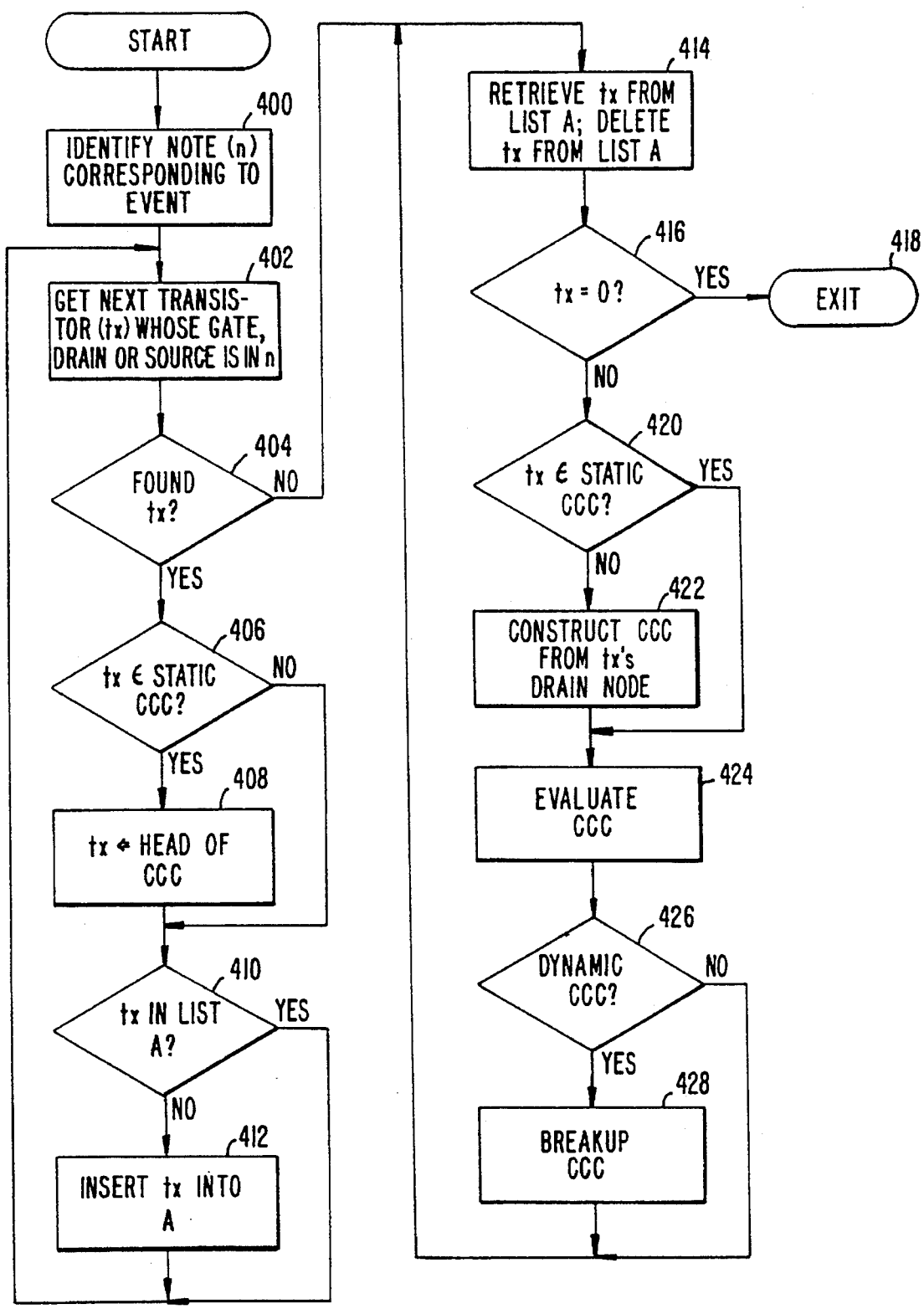
FIG. 14 is a flowchart of event processing.

After the data output determination is complete, event x is processed in block 240 in accordance with the subroutine displayed in FIG. 14. After event processing for x is complete, the program scans the event wheel for the next pending event in block 222, repeating the process shown in FIG. 8 until the next-pending-event time exceeds total simulation time, at which point, simulator 22 terminates the simulation and outputs its result.

C. Event Processing

As mentioned above, events are defined as any node voltage changes at a future time that exceed a certain threshold, or "event resolution". A voltage change on a node may cause changes in its "fanout" transistors, which are the transistors having the affected node as a gate terminal. Nodes that are in the same "channel connected component" as the affected transistor, i.e. those nodes connected to the affected transistor through one or more transistor channels, may see their voltages changed. As described below, such changes are "evaluated."

If it is found that a node, in the foregoing channel connected component, will achieve a voltage level at a future time such that the new voltage level and the voltage level at which the node caused an event last time differ by more than the event resolution, the evaluation is halted. An event is scheduled for the affected node at the future time.

When the channel connected component is evaluated because one of the gate terminals has a voltage change, all the events belonging to the nodes in the evaluated channel connected component that are pending at some future time are canceled. This is because such events were scheduled as a result of evaluations that have been based on gate-terminal voltages that are no longer valid. If such events are still valid, they will be scheduled again as the result of the present evaluation. Event cancellation is efficiently achieved by setting a flag in the event data structure (i.e., event wheel).

In addition to the foregoing, event processing requires continued evaluation of the channel connected component to which the node causing the event belongs. This is necessary because when this node was deemed to be causing a future event, the evaluation of the channel connected component to which it belongs was halted, and therefore should be resumed when simulation time advances to the time at which the said event is scheduled. An exception to this continued evaluation is when the said channel connect is found to be in a steady state—voltages are not changing—and therefore an evaluation is unnecessary.

FIG. 14 illustrates the flow of event processing. A node "n" corresponding to a scheduled event is initially identified in block 400. The routine next searches for any transistor whose gate, drain or source is attached to n in block 402. If a transistor is not found, the subroutine stops searching in block 404. Otherwise, a found transistor is checked for membership in a static CCC in block 406. If the transistor is part of such a CCC, the head of the CCC (i.e., first transistor 344) identified in G structure 342 (FIG. 12) replaces the found transistor in block 408, and serves as a means of identification for the corresponding CCC.

In block 410, the transistor is checked for its presence in "list A," a global variable identifying transistors affected by events at the present time. If the transistor is not already on the list, it is inserted in block 412. Conversely, if the transistor is already on the list, or after its insertion thereon, the subroutine returns to block 402 to retrieve the next transistor connected to the affected node. In the cycles that follow, each transistor that is part of the same CCC is not inserted into list A due to a consistent use of first transistor 344 (FIG. 12) to identify corresponding CCCs. This avoids redundant calculations when processing the events.

After all potentially affected transistors or their corresponding static CCC(s) have been identified in list A, processing begins. A transistor is removed from list A and its presence is deleted in block 414. A check is made in block 416 as to whether the last transistor has already been removed from list A. If the list was already empty at block 414, no transistor was retrieved, and the subroutine is exited in block 418. Control subsequently resumes with the flowchart in FIG. 8.

Conversely, if a transistor has been retrieved, a check is made to determine whether it is part of a static CCC in block 420. If it is not, a dynamic CCC is created from the drain node of the transistor in block 422 by calling subroutine build_ccc_from node, as discussed above. After a CCC has been either created (dynamic) or identified (static) for a retrieved transistor, it is evaluated in block 424 in accordance with the flowcharts shown in FIGS. 15 and 16.

Once CCC evaluation is complete, a check is made to determine whether the CCC is static or dynamic in block 426, the latter requiring breakup in block 428. The subroutine then returns to block 414 to retrieve the next transistor from list A. If no more transistors are present, as noted above, the routine is exited in block 418.

D. CCC Evaluation

The simulator uses a rigorous mathematical process, based on the solution of a set of nonlinear ordinary differential equations defining the response of a CCC. A stable numerical integration method, e.g. the Backward Euler method, is used to transform these differential equations into a set of nonlinear equations. Nonlinear MOS transistors contained in the subject CCC are then replaced with linear elements, the values of which are looked up from the I-g-gm tables described above. This replacement results in a set of linear equations describing the now linear CCC, which is solved with a sparse matrix routine.

Figure 15:
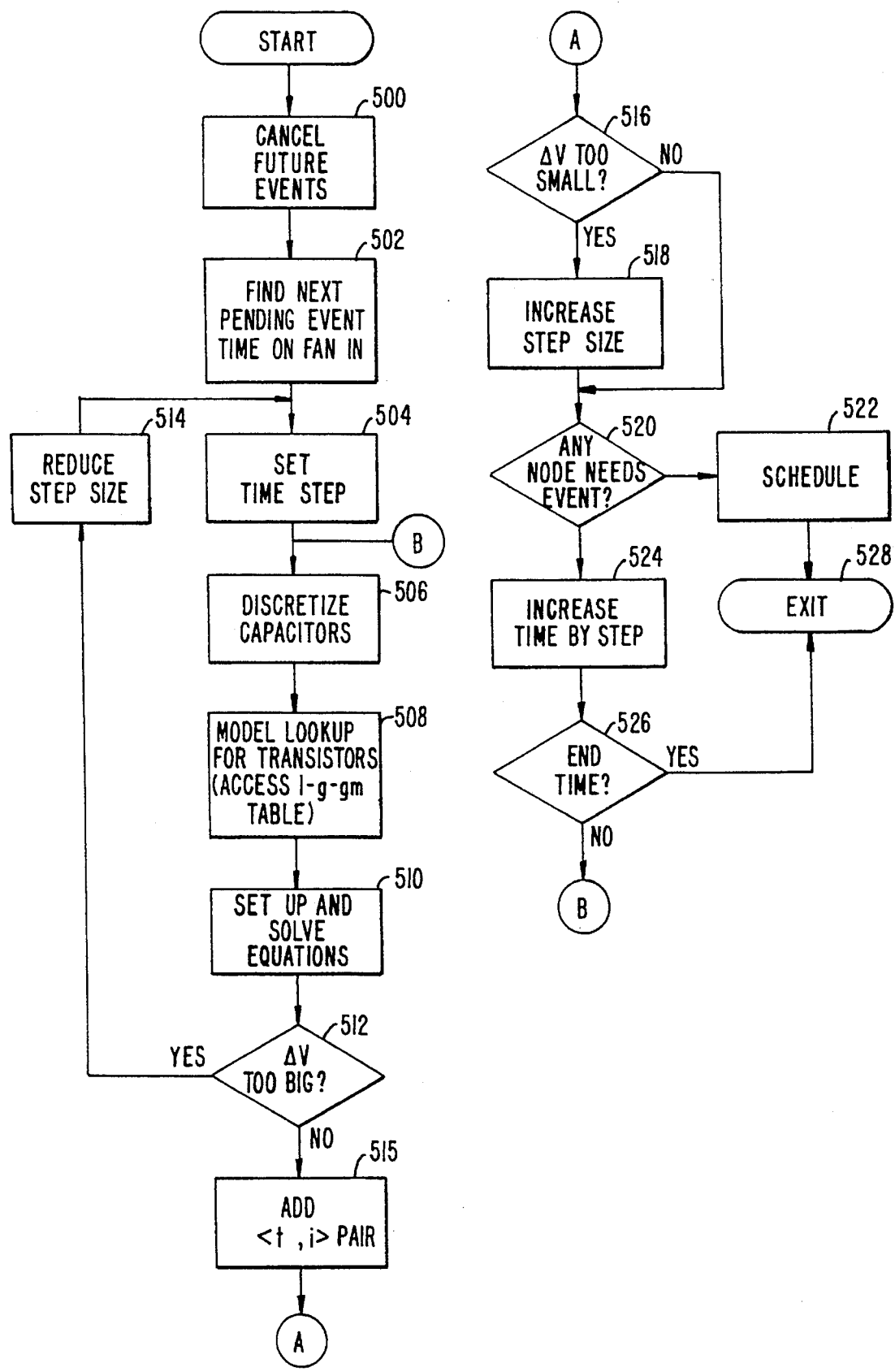
FIG. 15 is a flowchart of channel connected component evaluation.

Contrary to the standard procedure of solving nonlinear ordinary differential equations many times to ensure convergence, the simulator solves linear approximations of these equations at each time point only once. This is possible because of mild nonlinearities for MOS circuits and careful step size control in numerical integration. Step sizes are automatically adjusted so that between two time points the largest voltage change on any node is kept within a small threshold ("$\Delta V$"). If, after the solution of linear equations, this condition is violated, the solution is rejected and step size reduced. The flowchart in FIG. 15 illustrates this process.

As mentioned above, and shown in FIG. 15, CCC evaluation begins with canceling all events belonging to the nodes that are pending at some future time in block 500. Pending event time on each fan-in node (i.e., typically a node connected to the gate of a transistor whose channel is part of the CCC being evaluated, but whose gate belongs to a different CCC) for the CCC is then determined in block 502 by scanning node data structure 160 (FIG. 9b) for event pointer 170. This pointer identifies the pending event time for the corresponding node. After all the pending event times for each fan-in node are reviewed, the event which is nearest in time (i.e., the next pending event time) is identified, and the time for this event becomes the evaluation end time.

Time step $\Delta t$ is initialized in block 504 using a Forward-Euler based time-step predictor. In brief, the predictor is based on the simple capacitor current-voltage relationship i=cdv/dt. The current (i) is obtained by algebraically summing all incoming and outgoing current at the subject node. Capacitance is determined from values provided by technilogy file 30 (i.e., parasitic) and discrete components. Finally, a preferred voltage threshold limit (i.e., "$\Delta v$," the maximum voltage change allowed on any node during CCC evaluation) is known. Based on these values, an initial value for At is predicted. A description of such a predictor is provided in L. Chua, P. M. Lin, *Computer-Aided Analysis of Electronic Circuit Algorithms & Computational Techniques*, Prentice Hall (1975), incorporated herein by reference.

The CCC at issue is solved by replacing the components of the CCC with linear elements, and solving a set of linear equations based on the transformed CCC. Initially, all capacitors are transformed into discrete current source and resistor pairs in block 506. Next, the I-g-gm model for transistors is referenced to linearize all transistors in the subject CCC in block 508. Finally, a set of linear equations defining the response of the circuit is set up and solved in block 510.

Regarding block 506, capacitors are transformed into current source and resistance pairs via application of basic capacitor voltage-current relationships, as illustrated in equation 21, discussed below.

Figure 16:
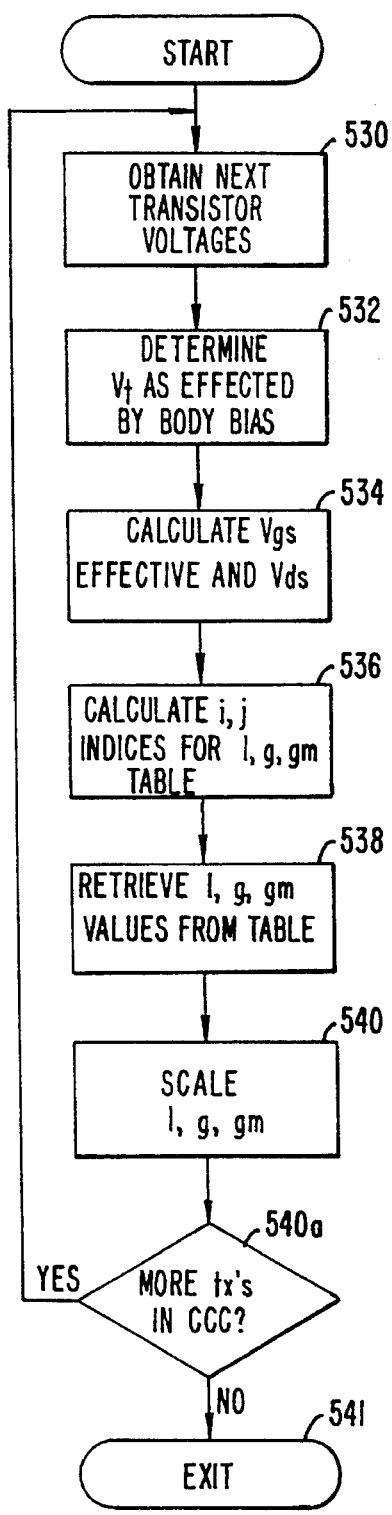
FIG. 16 is a flowchart of piece-wise linear approximation.

Regarding block 508, the steps for accessing the I-g-gm table for each transistor are illustrated in FIG. 16. First, transistor gate ($V_g$), source ($V_s$) and drain ($V_d$) voltages are retrieved from the current simulation model in block 530. These values are stored in node data structure 160, field 176 (FIG. 9b) of each node connected to the corresponding transistor elements. To compensate for body bias effect, $V_t$ is calculated in block 532 in accordance with equation 7 discussed above, where the coefficients VTO and $\gamma$ are included in technology file 30. $V_{gs,eff}$ and $V_{ds}$ are calculated in block 534, in accordance with equation 5, and the following equation, respectively:

$$Vd=Vd-Vs \quad (17)$$

Once these values are determined, the indices for the I-g-gm table are calculated in block 536 pursuant to the following equations:

$$Row=(Vds-Vds\ start)/Vds\ increment \quad (18)$$

$$Col.=(Vgs-Vgs\ start)/Vgs\ increment \quad (19)$$

Using the row and column indices calculated above, the values for I, g, and gm are retrieved from the corresponding transistor two-dimensional table in block 538. As mentioned above, the $I_{ds}$ values in table 110 are normalized over $W_{eff}/L_{eff}$. This also normalizes the I, g, gm values. Accordingly, where a table does not exist for a particular transistor size (i.e., W and L), the table based on the closest dimensions is sought, and the I, g and gm values are scaled by multiplying each with W/L ratio 136 (contained in transistor data structure 132 (FIG. 9)) of the simulated transistor in block 540. These scaled values are then stored in data structure 132, fields 145–147 (FIG. 9) of the simulated transistor, to be later retrieved for solving linear circuit equations, as discussed below.

After I, g and gm values have been obtained for all transistors in the subject CCC pursuant to block 540a, control is returned to the subroutine of FIG. 15 in block 541.

Unlike capacitors and transistors, discrete resistors require no special calculations to be placed in proper form for insertion into linearized circuit equations. The resistor value, already linear, is simply moved from the inputted netlist to a parameter record within transistor data structure 132 (FIG. 9).

Regarding block 510 (FIG. 15), a set of ordinary nonlinear differential equations characterizes the circuit before its transformation into linear elements. As noted above, the Backward Euler method is used to transform these differential equations into a set of nonlinear equations. The equations are then made linear by inserting MOS transistor linear approximations (i.e., I, gm, g) into the set of nonlinear equations. The new set of linear equations describing the resultant linear circuit is solved with a sparse matrix routine.

Figure 17:
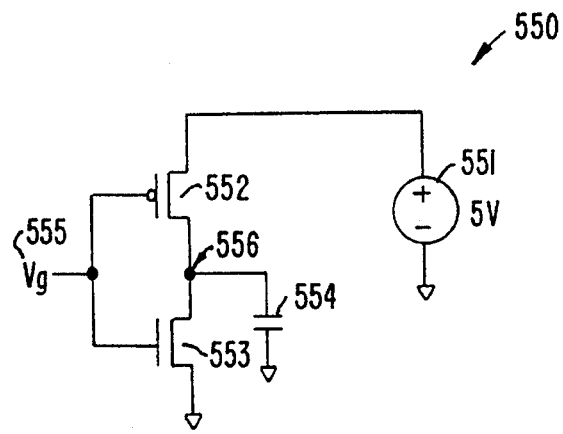
FIGS. 17–19 schematically illustrate piece-wise linear approximation.
Figure 18:
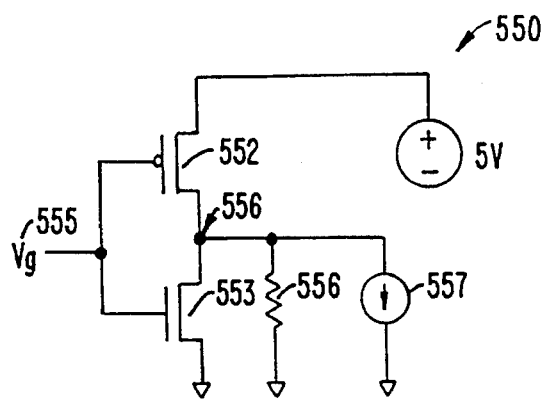
Figure 19:
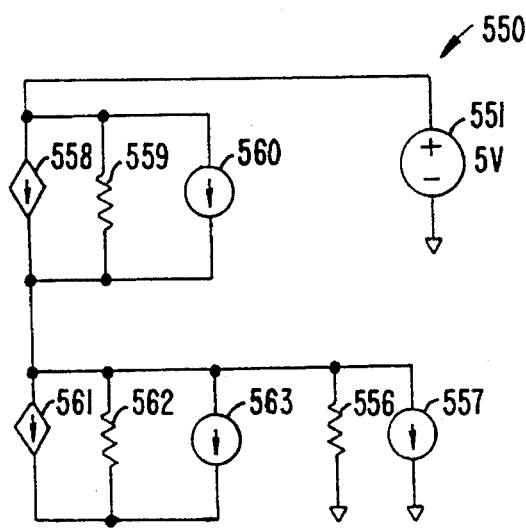

The effects of blocks 506, 508 and 510 are illustrated in FIGS. 17–19. FIG. 17 shows a simple CCC 550 having a PMOS transistor 552 serially connected to a 5 volt power supply 551 and NMOS transistor 553. A discrete capacitor 554 is connected to the NMOS/PMOS junction, and a known voltage 555 is applied to the gates of both transistors. At time T (event time), the voltage at node 556 (V0) is known and therefore the circuit is solved. The value of node 556 (V) at time $\Delta t$ is determined using Kirchhoff's Current Law ("KCL"); i.e., the sum of all currents toward a node must be zero at any instant of time. Applying KCL to the circuit in FIG. 17 results in the following equation:

$$C\, dv/dt|_t = P(5, V, V_g) - N(V, 0, V_g) \quad (20)$$

where:

$t = T + \Delta t$; and $P(V_d, V_s, V_g)$ and $N(V_d, V_s, V_g)$ represent nonlinear ordinary differential equations for transistor current.

FIG. 18 illustrates CCC 550 where capacitor 554 is replaced with resistor 556 and current source 557 in accordance with block 506 of FIG. 15. Again applying KCL, the summation of the currents at node 556 may be expressed as follows:

$$C((V-V0)/\Delta t) = P(5, V, V_g) - N(V, 0, V_g) \quad (21)$$

where:

resistor 556=$C/\Delta t$; current source 557=$((C/\Delta t)*V0)$

Finally, I (current source), g (resistor) and gm (transconductor) values for transistors 552 and 553 are extracted from appropriate I-g-gm tables, scaled, and inserted into CCC 550 thereby linearizing the transistors, as shown in FIG. 19. In accordance with block 508 (FIG. 15), transistor 552 is replaced with transconductor 558 (gmp), resistor 559 (gp) and current source 560 (Ip). Similarly, transistor 553 is replaced with transconductor 561 (gmn), resistor 562 (gn) and current source 563 (In). Again applying KCL (in accordance with block 510), the summation of the currents at node 556 may be expressed as follows:

$$C((V-V0)/\Delta t) = (Ip + gp(5-V) + gmp(Vg-5)) - (In + gn(V-0) + gmn(Vg-0)) \quad (22)$$

Since this is a simple CCC, there is only one variable, "V." Generally a plurality of variables are present and, as noted above, the set of linear equations are solved with a sparse matrix routine.

Of course, a CCC may also be evaluated using Kirchhoff's Voltage Law ("KVL"); i.e., the sum of all voltage drops around a loop must be zero at all times. The use of KCL or KVL is dictated by the circuit configuration of the CCC being evaluated.

Returning to the flowchart of FIG. 15, after the equations for a CCC have been solved, the resulting voltage is evaluated in block 512 to ensure $\Delta V$ does not exceed some predefined threshold. This value may be set by user, or the simulator will provide a default value of one-tenth the voltage supply ($V_{dd}$).

If $\Delta V$ is too large, the step size ($\Delta t$) is reduced in block 514, and the equations are solved again. After $\Delta V$ is found to be satisfactory (i.e., sufficiently small), calculations are performed in block 515 to determine the amount of current passing through each transistor in the subject CCC at a particular instant in time that is either connected to a "power node" (i.e., a node connected to a power supply or ground) or specified by the user. Each value with its corresponding time is recorded in block 515 as a "time-current pair" ("<t,i>"), as discussed below.

Should the $\Delta V$ be too small, the step size is increased in block 518 for subsequent calculations. Values need not be recalculated at time t for an undersized $\Delta V$.

In block 520, node(s) in the subject CCC attached to fanout transistor(s) are evaluated for the presence of events. As noted above, fanout transistors have the affected node (i.e., the node bearing the event) as a gate terminal. Where this node achieves a voltage level at a future time such that the new voltage level and the voltage level at which the node caused an event last time differ by more than the "event resolution" (defined above), the future event is scheduled on the event wheel of the simulator in block 522, and evaluation is halted in block 528. Control is then returned to the program described in FIG. 14, at time equal to the time when evaluation began.

Conversely, if no new events are detected, evaluation time is increased by $\Delta t$ in block 524, and end of evaluation time (based on next pending fan-in event time, as discussed above) is checked in block 526. If evaluation time has expired, evaluation is terminated and control is returned to the program described in FIG. 14. Otherwise, the subroutine returns to block 506 to evaluate the CCC at the new evaluation time (i.e., prior evaluation time+$\Delta t$).

While event processing typically provides for the identification of only a single event in block 520, multiple events may, in fact, be identified if they occur simultaneously. In such a situation, the simultaneous events will be scheduled at the same future timestep in the event wheel of the simulator in block 522.

E. Current Processing

1. Time-Current Calculation

Each time the equations defining a channel connected component are solved in accordance with FIG. 15 (i.e., every $\Delta t$), current values for select transistors are recorded with the corresponding time t. These values are identified as time-current pairs ("<t,i>"), and are stored in transistor data structure 132 under "t-i_pairs." (As illustrated in FIG. 9a, t-i_pairs are configured as a linked list within data structure 132.) The current in each <t,i> pair is the change in current (i.e., $\Delta i$) from the previous value recorded.

Further, since resistors are simply "specialized" transistors (as discussed above), current through these elements may also be calculated and monitored. Accordingly, the term "transistor" in the following discussion applies equally to netlist resistors, as both elements are constructed from the same modeling structure defined above.

The simulator automatically selects all transistors connected to a "power node" (i.e., a node connected to a power supply or ground) for time-current calculation in order to determine total current passing through the node. When a simulation progresses to a new time t, time-current pairs associated with transistors connected to power nodes may be summed to determine the total current being provided by the power supply, or sunk by ground at time t. Further, time-current pairs from these same transistors recorded at time intervals less than or equal to a new time t may be summed at each corresponding interval, thereby constructing a waveform of the total current in the power supply or ground line over some predefined time period.

The time-interval summation required for power analysis is efficiently carried out with the preservation of $\Delta i$ rather than i in each time-current pair. Preservation of $\Delta i$ enables each subsequent time-interval summation to be performed only with respect to changes to the current as reflected by newly-recorded values of $\Delta i$. In other words, there is no need to sum the current at each transistor connected to a power supply for each time interval since this was done at the first time interval. Each succeeding interval need only reflect the change in the total current as indicated by the total value of $\Delta i$.

In addition to tracking transistors (and resistors) connected to power supplies and ground, a user may specify individual transistors (or resistors) for time-current calculation. Such calculation will result in a series of time-current pairs which may be used to construct a waveform of the current passing through each selected transistor (or resistor) over some predefined time period. Construction of time-current pairs is illustrated in FIG. 20.

Figure 20:
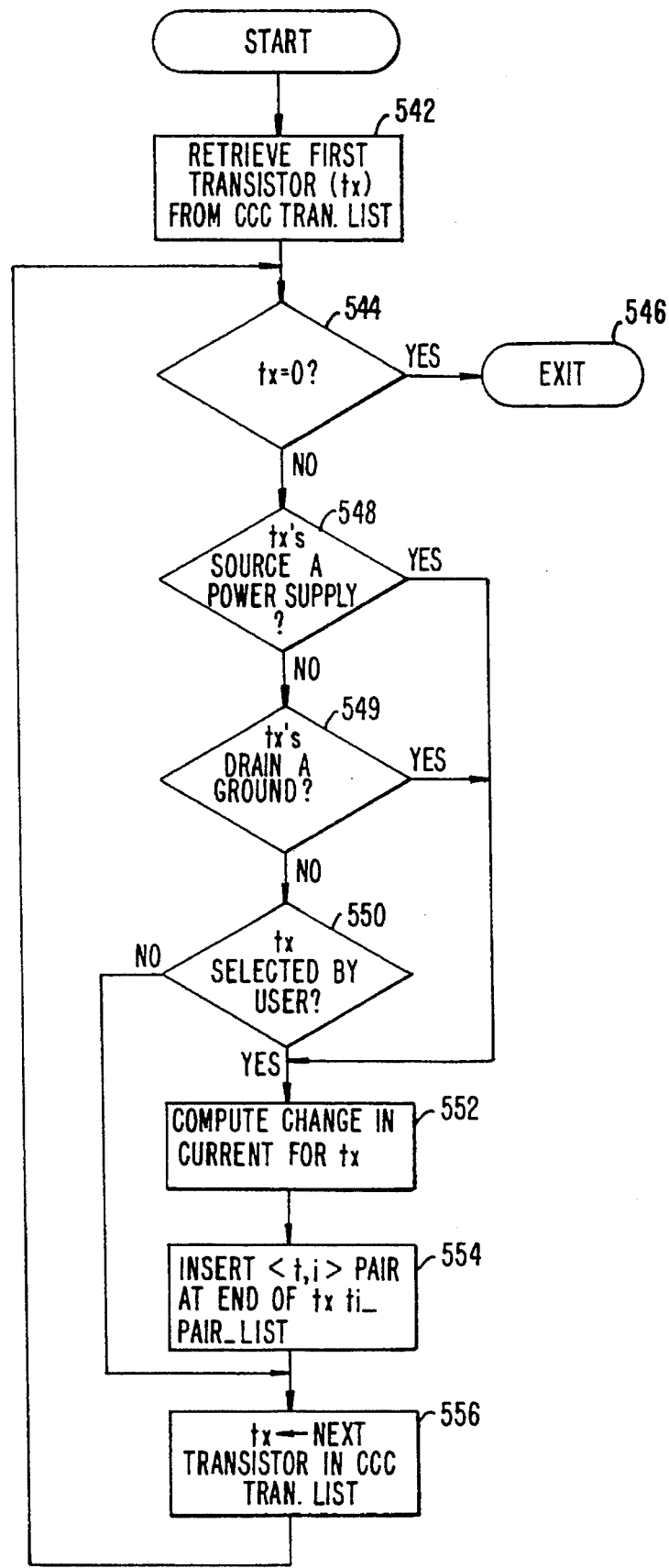
FIG. 20 is a flowchart of the construction of time-current pairs.

Referring to FIG. 20, time-current pair construction begins with the retrieval of the first transistor from the subject CCC transistor list (342, FIG. 12) in block 542. After checking to determine whether all transistors in the CCC have been examined in block 544, the retrieved transistor is examined for connection to a power supply in block 548, connection to ground in block 549 or selection by user in block 550. If none of these tests are answered in the affirmative, no time-current pair is constructed, and the next transistor in the CCC is selected in block 556.

Conversely, where a transistor does satisfy blocks 548, 549 or 550, the change in current at that transistor from the last current value recorded is computed. The present current in the transistor is calculated in accordance with equation 22. The last current value recorded at the transistor is retrieved from field 155 of transistor data structure 132 (FIG. 9). The change in current is then calculated in accordance with equation 23, and stored in block 554 as a time-current pair at the end of the "t-i pair" linked list 140 in data structure 132, as shown in FIG. 9a. Similarly, the newly-measured present current is also stored in structure 132 as a "new" last current value recorded in field 155.

$$i_{present}=I+g(V_d-V_s)+gm(V_g-V_s) \quad (22)$$

where:

I, g and gm are in transistor data structure 132 and $V_g$, $V_s$ and $V_d$ are the newly solved voltages from block 510.

$$\Delta i=(last\ current\ value)-(i_{present}) \quad (23)$$

The next transistor in the subject CCC is then retrieved in block 556 from transistor list 342 (FIG. 12), and the process as shown in FIG. 20 is repeated until all transistors have been examined and the subroutine is exited in accordance with blocks 544,546.

Calculating changes in current values for transistors functioning as resistors is essentially the same as described above. However, present current for the resistor is calculated with the following equation:

$$i_{present}=(V_d-V_s)g \quad (23a)$$

2. Power Supply Time-Current Alignment

Since transistors connected to a power node do not necessarily belong to the same channel connected component, they are most likely evaluated separately with different time steps. As a result, the lists of time-current pairs for the transistors on a power node are likely to be mis-aligned for their time points, making it impossible to perform a direct summation for each time interval.

Power node time-current alignment is performed in the simulator as part of its data output operation. As discussed above with respect to block 236 in FIG. 8, data is output periodically where the present event time T minus a variable "last_flush" is greater than another variable PRINT. The routines accessed to perform time-current output arrange the data both for efficient output processing and to correct potential time mis-alignment problems.

Figure 24:
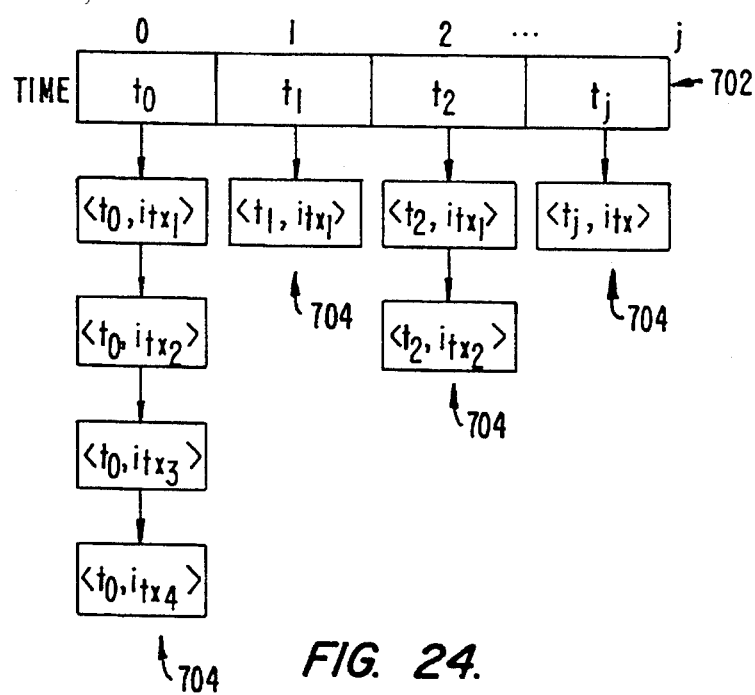
FIG. 24 illustrates a staging_area array.

The technique in the simulator efficiently overcomes time mis-alignment by first scanning each transistor <t,i> list, and then inserting the <t,i> pairs into linked lists held in a one-dimensional array corresponding to time. As shown in FIG. 24, an appropriate array/linked list configuration 700 ("staging_area") includes one-dimensional array 702, with each cell containing linked lists of <t,i> pairs 704. These <t,i> pairs belong to different transistors all having current changes at an identical time "t."

The variables $i_{tx1}$, $i_{tx2}$, etc. in FIG. 24 represent the location of the entry in the linked list, not necessarily the first and second transistors of the netlist. Clearly, the size of a netlist associated with any time t will rise or fall based on the number of transistors having a <t,i> pair recorded at that time. After all lists are scanned, array 700 naturally contains all the time-current pairs properly aligned.

Figure 21:
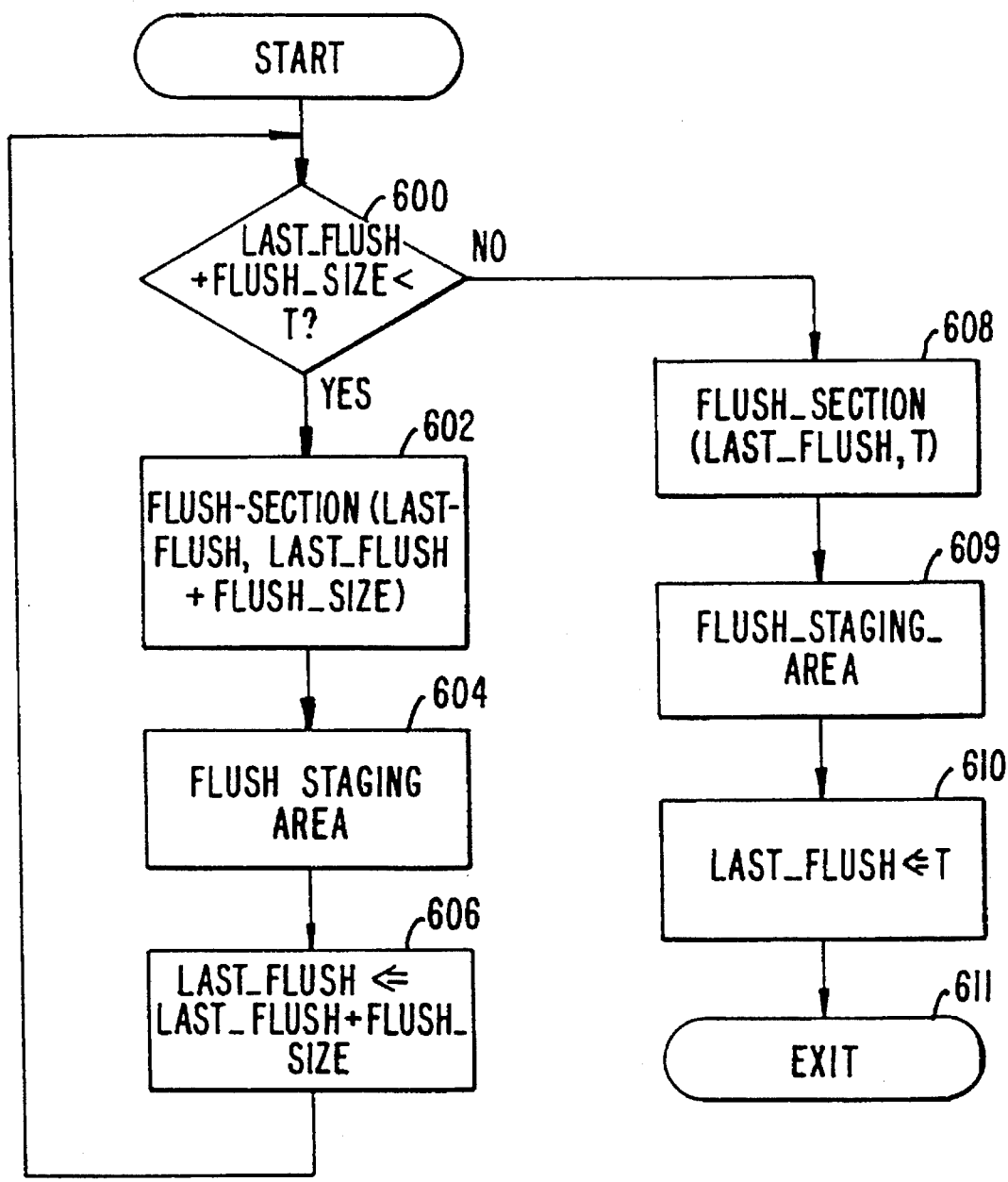
FIG. 21 is a flowchart of outputting data to a holding array.
Figure 22:
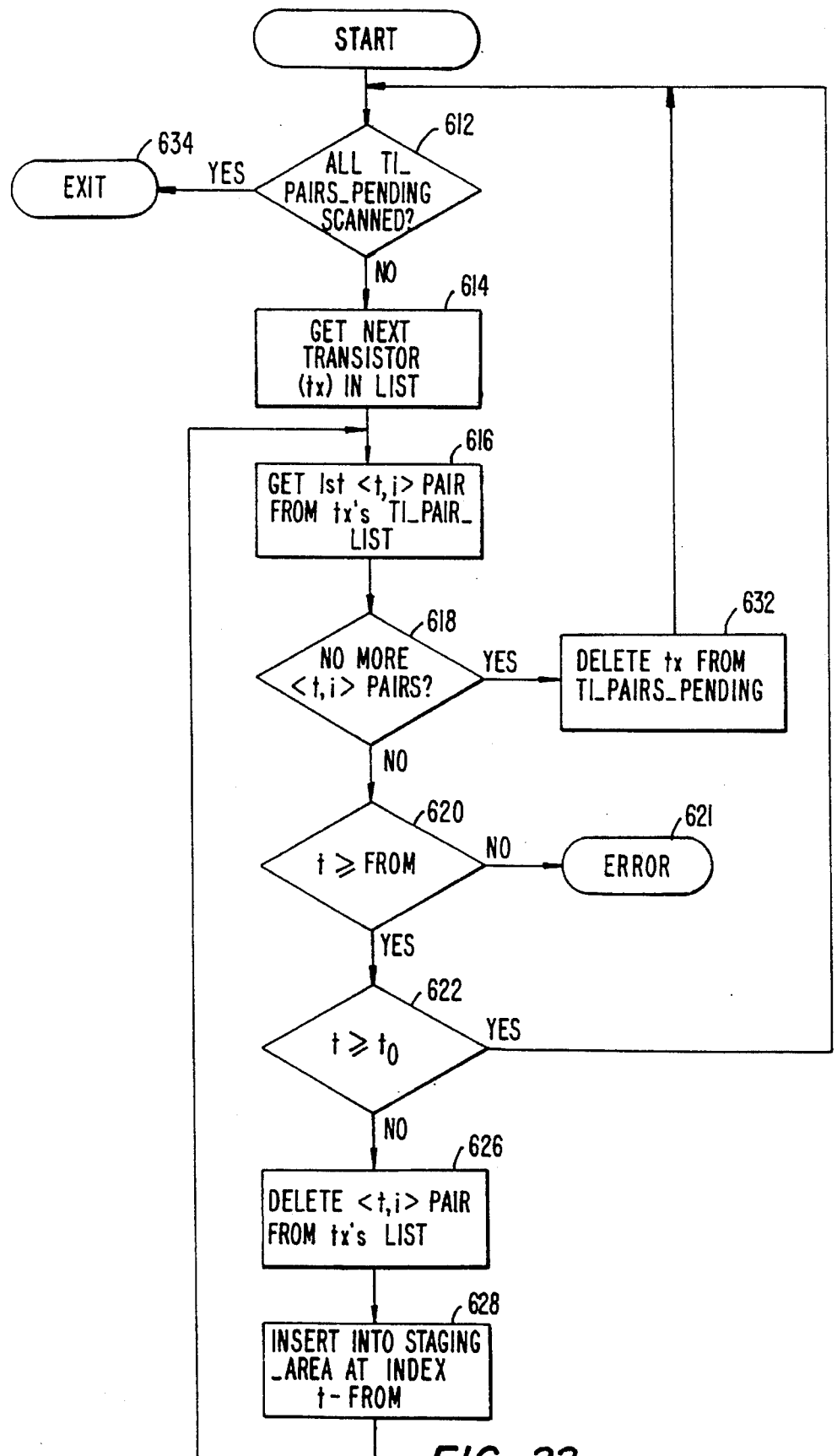
FIG. 22 is a flowchart of staging_area array construction.

The process of staging_area 700 construction is illustrated in FIGS. 21–22. The terms used in this process are defined in Table 3.

TABLE 3

| | |
|---|---|
| 1. ti_pairs_pending: | List of transistors having unflushed <t,i> pairs |
| 2. staging_area: | An array, each cell of which is a linked list of <t,i> pairs at identical times. (Time is rounded off to a resolution of h (predefined minimum step size.) Typically this is 0.01 ns, user-defined. |
| 3. last_flush: | Time represented by the first cell of the staging area. Initialized to 0; same unit as h. |
| 4. flush_size: | The quantity of cells in staging_area |

Referring to Table 3 and FIG. 21, staging_area construction begins with determining whether the summation of last_flush and flush_size exceeds current time T in block 600. Last_flush represents the time at which the last set of time-current pairs was output. Flush_size is the quantity of cells in the staging area, wherein each cell represents one printing timestep (discussed below).

If the summation is less than current time T, the subroutine flush_section is called in block 602, which outputs <t,i> pairs from field 140 of active transistor data structures 132 (FIG. 9) to staging_area 700 (FIG. 24). The output time interval is from "last_flush" to "last_flush+flush_size."

Upon completing flush section, subroutine flush_staging_area is called in block 604 to output data from staging_area 700 to a printer or other medium (i.e., floppy disk, monitor, etc.).

After the staging_area has been emptied, last_flush is incremented in block 606 by flush_size, and the foregoing operation is repeated until the summation of last_flush with flush_size equals or exceeds current simulation time T in block 600. At this point, the remaining <t,i> pairs (up to time T) are output to staging_area 700 via flush_section in block 608 and output from the staging area via flush_staging_area in block 610. Last_flush is then set equal to T in block 610 and the subroutine is exited in block 611.

The flush_section operation is illustrated in FIG. 22. Initially, ti_pairs_pending (see Table 3) is scanned for the presence of a transistor having unflushed <t,i> pairs in block 612. If one exists, the transistor is retrieved from the list in block 614, and the first <t,i> pair associated with the retrieved transistor is sought in block 616. The availability of pairs is checked in block 618. If none are available, the transistor is deleted from ti_pairs_pending in block 632, and the subroutine returns to block 612 to determine the availability of another transistor. If no more transistors are available, the subroutine is exited in block 634.

Where a <t,i> pair is retrieved, the time is checked to ensure it falls within the time interval being output in blocks 620,622. If t is before the time interval, an error signal is generated in block 621. Conversely, if t is after the current time interval, no more relevant <t,i> pairs are available (since the pairs are arranged chronologically, as shown in transistor data structure 132, field 140, in FIG. 9a) and the subroutine returns to block 612. Note that a transistor with pending future time-current pair(s) is not deleted. These pairs are saved for a potential future application of flush_section.

Where a <t,i> pair is found temporally acceptable, the pair is deleted from the subject transistor's <t,i> list in block 626, and the value is inserted into staging_area 700 at index j, where j=t (time of <t,i>)–tfrom (beginning time of interval) in block 628.

In the preferred embodiment, each cell identified by index j represents a time interval ("printing timestep") of typically 0.1 to 1.0 nanoseconds. Since the time interval in the <t,i> pairs is at a much higher resolution (typically 1.0 femtoseconds to 0.1 picoseconds), multiple <t,i> pairs may fit within a single cell for a particular transistor. Accordingly, some resolution is lost during the data output phase since only the last value of <t,i> for each transistor falling within the time range of a particular cell is actually saved. Of course, the printing resolution may easily be enhanced by reducing the printing timestep range, and therefore reducing the length of the time period represented by flush_size (i.e., the same quantity of data would represent a smaller interval of time therefor resolution would be increased).

The time-current pairs are not directly added to staging_area array 700 since some of the pairs may be invalidated later. As noted above, previously recorded events must be canceled every time a channel connected component is evaluated. Likewise, the time-voltage pairs with time greater than the present simulation time are also invalidated and canceled. Only those pairs with time less than or equal to the simulation time are valid since simulation time never goes backwards, as implied in the event driven algorithm.

3. Time-Current Output

Figure 23A:
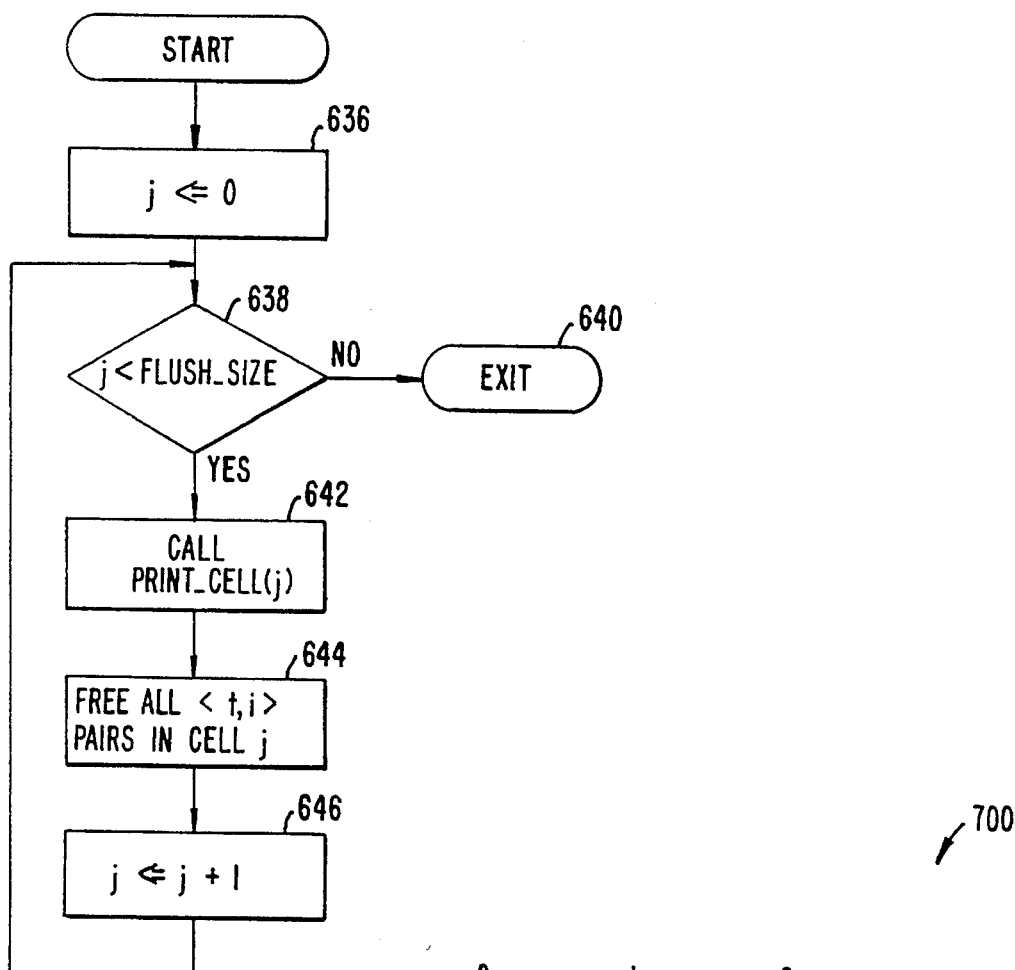
FIGS. 23a and 23b are flowcharts of data output processing.

As discussed above, <t,i> pairs loaded into staging_area 700 are subsequently output to an appropriate receiver (i.e., printer, monitor, disk drive) via the flush_staging_area subroutine. The first step in this subroutine, as shown in FIG. 23a, is setting the index for staging_area 700 to zero in block 636.

The staging area index ("j") is then checked to ensure it has not exceeded the size of the staging_area (i.e., "flush_size") in block 638. If it has all data has been output and the subroutine is exited in block 640. Otherwise, the subroutine print_cell is called in block 642 to output relevant data contained in staging_area cell j.

After print_cell is complete, all <t,i> pairs associated with cell j are deleted in block 644. The staging_area index is then incremented in block 646, and the foregoing process is repeated for each cell contained in staging_area 700.

Figure 23B:
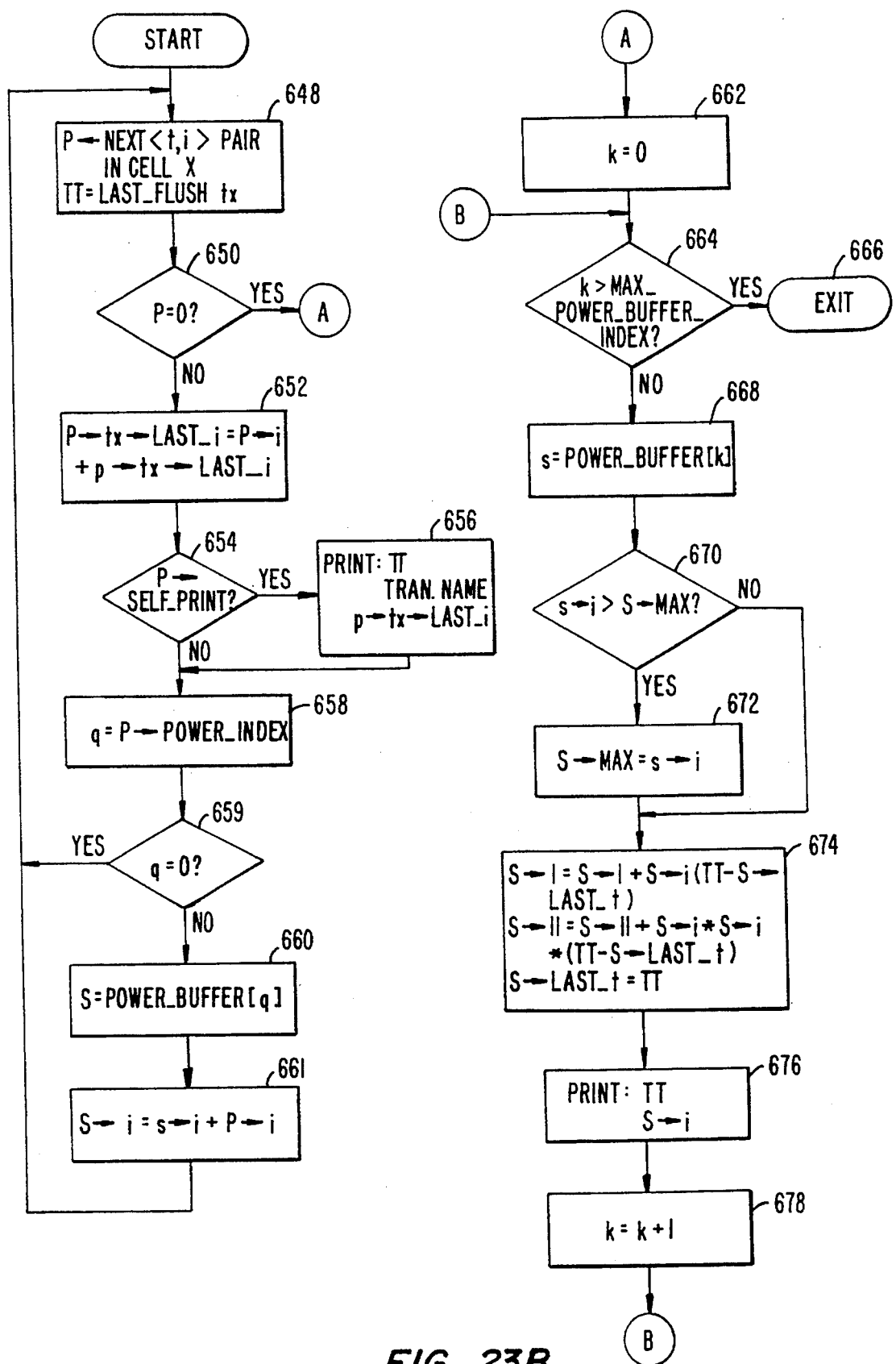

The print_cell subroutine is illustrated in FIG. 23b. Discussion of this subroutine is facilitated by the definitions provided in Tables 2, 4 and 5. Table 2 contains transistor data structure variables. The transistor data structure 132 is discussed above, and is illustrated in FIGS. 9 and 9a.

Table 4 contains power_buffer variables. A Power_buffer is a data storage array containing a cell (i.e., column) for each power supply or ground (i.e., each power node) attached to the simulated circuit. Each column contains vital statistics of its corresponding power node including node identification, present current value, and maximum current value.

TABLE 4

| | | |
|---|---|---|
| 1. i: | Present current | |
| 2. MAX: | Maximum current to date | |
| 3. I: | Numerator of average | |
| 4. II: | Numerator of RMS without square root | |
| 5. last_t: | Last time the power node current changed | |
| 6. node: | pointer to power node corresponding to buffer cell | |

Finally, Table 5 contains time-current variables. Time-current pairs (<t,i>) contain two transistor-specific variables: self_print and power_index. The former flags those transistors selected by the user for current output, and the latter identifies those transistors connected to a power supply or ground.

TABLE 5

| | |
|---|---|
| 1. self_print: | Boolean flag indicating if user wants to see transistor current |
| 2. power_index: | Index into power_buffer when transistor is connected to the corresponding power node |

Turning to FIG. 23b, print_cell initially retrieves the first <t,i> pair in cell x (subroutine variable equal to j in parent program) and sets the current time TT equal to the time represented by the corresponding staging_area cell in block 648. A check is made in block 650 for the success of time-current pair retrieval. If no more pairs exist in the cell (i.e., retrieval was unsuccessful), the subroutine branches to power_buffer processing in block 662. Otherwise, a new current value for transistor tx at time TT is calculated (based on the previous current value and Δi) and saved in block 652.

The self_print flag on the <t,i> pair is checked in block 654 to determine whether the user requested current data on the corresponding transistor. If the flag is set, current time TT, transistor name and current value is output in block 656.

After processing self_print, the subroutine sets a variable "q" equal to the power_index value of the subject <t,i> pair in block 658. If power_index equals zero in block 659, the corresponding transistor is not connected to a power node and the subroutine returns to block 648 to retrieve the next <t,i> pair. Otherwise, the corresponding transistor is connected to a power node, and variable s is set equal to the power_buffer cell corresponding to this supply/ground in block 660.

Having identified a transistor connected to the power supply or ground that has undergone some current change (as reflected by the presence of <t,i> pairs), print cell updates the present current value in the associated power_buffer cell in block 661. The subroutine then returns to block 648 to retrieve the next <t,i> pair in cell x and repeat the foregoing operation. After all pairs have been read from cell x, the subroutine branches to power_buffer processing in block 662.

Power_buffer processing begins by setting a counter k equal to 0 in block 662. A check is performed to determine whether the number of cells (i.e., power nodes) in power_buffer have been exceeded in block 664, in which case the subroutine is exited in block 666. Otherwise, variable s is set equal to the next available power_buffer cell in block 668, and several power_buffer variables are updated.

Initially, the prior maximum current in the power_buffer cell is replaced with the new current at time TT in block 672 if the latter is greater than the previous value as checked in block 670. Next, partial average and RMS current values are calculated in block 674 and stored in the power_buffer. These partial calculations increase the speed at which the final product may be accessed. Finally, last_t (last time the power node current changed) is updated with the current time TT in block 674.

Current value and time TT is then output in block 676, counter k is incremented in block 678, and the subroutine then returns to block 664 to process the next power_buffer cell, or exit via block 666 if all cells have been processed.

4. Instantaneous, Peak, Average and RMS Currents

The simulator also calculates the instantaneous, peak, average and RMS currents for any power node or transistor identified by the user.

Instantaneous current (i.e., <t,i> data) is automatically output for power nodes, and may be requested for any transistor by the user as described above.

Peak current (maximum current for all <t,i> pairs) for any power node is calculated in the print_cell subroutine, described above and in FIG. 23b.

Average and RMS currents are calculated in accordance with equations (24) and (25) provided below:

$$i_{average} = \frac{i_1(t_1 - t_2) + i_2(t_2 - t_3) + \ldots t i_L(t_L - t_{L-1})}{t_L - t_1} \quad (24)$$

$$i_{RMS} = \sqrt{\frac{i_1^2(t_1 - t_2) + i_2^2(t_2 - t_3) + \ldots + i_L^2(t_L - t_{L-1})}{t_L - t_1}} \quad (25)$$

As discussed above, print_cell provides partial calculation of these values in the form of the numerator of each equation. Such advanced calculations are also available for any transistor identified by the user by establishing transistor-specific storage buffers analogous to the power_buffer. The remaining arithmetic steps required to determine these values are obvious from the foregoing equations and need not be explained further.

One embodiment of the invention is implemented in software which runs on a Vnix™-based engineering workstations, as discussed above. A "c" language source code listing for this embodiment is provided in Appendix 1 to this application. In addition to the features already discussed, this embodiment includes routines which speed up d.c. initialization, trace a path from $V_{dd}$ to ground, calculate current at block (i.e., subcircuit) levels and provide for an R-C delay modeling and simulation algorithm for MOS circuits.

The invention has now been described in terms of a preferred embodiment. Modifications and substitutions will now be apparent to persons of ordinary skill in the art. Accordingly, it is not intended that the invention be limited except as provided by the appended claims.

What is claimed is:

1. In an appropriately programmed digital computer having a CPU, memory, user interface and printer, a method of simulating electronic circuits and analyzing these circuits with respect to timing behavior and power consumption comprising the steps of:

a) inputting a netlist of a circuit to be simulated identifying transistors and nodes;

b) inputting a technology file for characterizing transistors in said netlist, wherein said technology file initially contains a two-dimensional I-V table tabulating transistor drain to source currents at various drain-to-source and gate-to-source voltage pairs, said I-V table being subsequently converted into a two-dimensional linearization table holding piece-wise linear elements approximating MOS transistors;

c) inspecting each node in said netlist and constructing a static channel connected component at said each node where more than one transistor channel is coupled to said each node and where node quantity in said static channel connected component is below a maximum threshold value, said static channel connected component being stored in memory;

d) establishing initial voltage values at said each node in said netlist through input vectors;

e) advancing circuit simulation to a pending event next in time, wherein said pending event is a voltage change on a node that exceeds an event resolution, said voltage change being determined from a previous voltage level which caused an earlier event at said node;

f) identifying an affected transistor coupled to said node on which said pending event next in time is to occur;

g) associating an affected channel connected component with said affected transistor;

h) evaluating a response of said affected channel connected component to said pending event next in time through linear approximation, wherein each transistor contained in said affected channel connected component is replaced with a current source, resistor and transconductor retrieved from said technology file, said evaluating step including:

i) checking nodes contained in said affected channel connected component for event occurrence; and ii) scheduling an event occurrence when detected.

2. The method as recited in claim 1, wherein the step of associating an affected channel connected component with said affected transistor is a step of retrieving from memory a static channel connected component containing said affected transistor.

3. The method as recited in claim 2, wherein the step of associating an affected channel connected component with said affected transistor further comprises the step of constructing a dynamic channel connected component containing said affected transistor when no static channel connected component is available.

4. The method as recited in claim 3, wherein the step of evaluating a response of said affected channel connected component to said pending event next in time further comprises the steps of:

a) solving in one iteration over a time delta a set of linear equations approximating said affected channel connected component for a node voltage level; and b) reducing said time delta and re-solving said set of linear equations when said node voltage level exceeds a previous node voltage level by a predetermined error threshold.

5. The method as recited in claim 4, wherein the step of evaluating a response of said affected channel connected component to said pending event next in time further comprises the steps of:

a) recording changes in current and corresponding simulation time for a transistor connected to a power node and included in said affected channel connected component; and b) outputting current and corresponding simulation time values for said power node based on said changes in current for said connected transistor.

6. The method as recited in claim 4, wherein the step of evaluating a response of said affected channel connected component to said pending event next in time further comprises the steps of:

a) recording changes in current and corresponding simulation time for a first transistor connected to a power node and included in said affected channel connected component;

b) recording changes in current and corresponding simulation time for a second transistor connected to said power node and included in said affected channel connected component;

c) outputting current and corresponding simulation time values for said power node based on said changes in current for said first and said second connected transistors.

7. The method as recited in claim 5, wherein the step of evaluating a response of said affected channel connected component to said pending event next in time further comprises the steps of:

a) recording changes in current and corresponding simulation time for a transistor specified by a user and included in said affected channel connected component; and b) outputting current and corresponding simulation time values for said transistor specified by a user.

8. The method as recited in claim 5, wherein the step of evaluating a response of said affected channel connected component to said pending event next in time further comprises the steps of:

a) recording changes in current and corresponding simulation time for a resistor specified by a user and included in said affected channel connected component; and b) outputting current and corresponding simulation time values for said resistor specified by a user.

9. The method of claim 1 wherein said gate to source voltage applied to said two-dimensional I-V table is an effective gate to source voltage, said effective gate to source voltage being a function of a threshold voltage of a MOS transistor.

10. The method of claim 9 wherein said technology file includes a linear approximation of a body bias voltage and threshold voltage relationship for a MOS transistor, said linear approximation being used to modify said threshold voltage value due to body bias effects, said modified threshold voltage used to determine said effective gate-to-source voltage.

11. The method of claim 5 further comprising the step of calculating average current provided by said power node, wherein a calculation is performed producing a partial value of average current at said power node after a change in current at said power node, said partial value being temporarily stored in memory.

12. The method of claim 5 further comprising the step of calculating root-mean-square current of said power node, wherein a calculation is performed producing a partial result after a change in current at said power node, said partial value being temporarily stored in memory.

13. In an appropriately programmed digital computer having a CPU, memory, user interface and printer, a method of simulating electronic circuits and analyzing these circuits with respect to timing behavior and power consumption comprising the steps of:

a) inputting a netlist of a circuit to be simulated identifying transistors and nodes;

b) inputting a technology file for characterizing transistors in said netlist, wherein said technology file initially contains a two-dimensional I-V table tabulating transistor drain to source currents at various drain-to-source and gate-to-source voltage pairs, said I-V table being subsequently converted into a two-dimensional linearization table holding piece-wise linear elements approximating MOS transistors;

c) inspecting each node in said netlist and constructing a static channel connected component at said each node where more than one transistor channel is connected to said each node and where node quantity in said static channel connected component is below a maximum threshold value, said static channel connected component being stored in memory;

d) establishing initial voltage values at said each node in said netlist through input vectors;

e) advancing circuit simulation to a first and a second pending event, wherein each pending event is a voltage change on a node that exceeds an event resolution, said voltage change being determined from a previous voltage level which caused an earlier event at said node;

f) identifying a first affected transistor coupled to a node on which said first pending event is to occur;

g) identifying a second affected transistor coupled to a node on which said second pending event is to occur;

h) associating a first and a second affected channel connected component with said first and second affected transistors, respectively;

i) evaluating a response of said first affected channel connected component to said first pending event through linear approximation, wherein each transistor contained in said first channel connected component is replaced with a current source, resistor and transconductor retrieved from said technology file, said evaluating step of said first affected channel connected component including:

i) checking nodes contained in said first channel connected component for event occurrence;

ii) scheduling an event occurrence when detected; and iii) recording changes in current and corresponding simulation time for a first transistor connected to a power node and included in said first affected channel connected component;

j) evaluating a response of said second affected channel connected component to said second pending event through linear approximation, wherein each transistor contained in said second channel connected component is replaced with a current source, resistor and transconductor retrieved from said technology file, said evaluating step including:

i) checking nodes contained in said second channel connected component for event occurrence;

ii) scheduling an event occurrence when detected; and iii) recording changes in current and corresponding simulation time for a second transistor connected to said power node and included in said second affected channel connected component;

k) Outputting current and corresponding simulation time values for said power node based on said changes in current of said first and said second connected transistors.

14. The method as recited in claim 13, wherein the step of associating a first and a second affected channel connected component with said first and second affected transistors is a step of retrieving from memory a first static channel connected component containing said first affected transistor.

15. The method as recited in claim 14, wherein the step of associating a first and a second affected channel connected component with said first and second affected transistors further comprises the step of constructing a first dynamic channel connected component containing said first affected transistor when no first static channel connected component is available.

16. The method as recited in claim 15, wherein the step of evaluating a response of said first affected channel connected component to said first pending event further comprises the steps of:

a) solving in one iteration over a time delta a set of linear equations approximating said first affected channel connected component for a node voltage level; and b) reducing said time delta and re-solving said set of linear equations when said node voltage level exceeds a previous node voltage level by a predetermined error threshold.

17. The method as recited in claim 15, wherein the step of evaluating a response of said first affected channel connected component to said first pending event further comprises the steps of:

a) creating a set of linear equations approximating said first affected channel connected component, wherein said set of linear equations satisfies a constraint that a summation of all currents toward a node is zero;

b) solving in one iteration over a time delta said set of linear equations for a node voltage level; and c) reducing said time delta and re-solving said set of linear equations when said node voltage level exceeds a previous node voltage level by a predetermined error threshold.

18. The method as recited in claim 15, wherein the step of evaluating a response of said first affected channel connected component to said first pending event further comprises the steps of:

a) creating a set of linear equations approximating said first affected channel connected component, wherein said set of linear equations satisfies a constraint that a summation of all voltage drops around a loop is zero;

b) solving in one iteration over a time delta said set of linear equations for a node voltage level; and c) reducing said time delta and re-solving said set of linear equations when said node voltage level exceeds a previous node voltage level by a predetermined error threshold.

19. The method as recited in claim 16, wherein the step of evaluating a response of said first affected channel connected component to said first pending event further comprises the steps of:

a) recording changes in current and corresponding simulation time for a transistor specified by a user and included in said first affected channel connected component; and b) outputting current and corresponding simulation time values for said transistor specified by a user.

* * * * *